US012149886B2

(12) United States Patent
Grinnip, III et al.

(10) Patent No.: US 12,149,886 B2
(45) Date of Patent: Nov. 19, 2024

(54) TRANSDUCER STEERING AND CONFIGURATION SYSTEMS AND METHODS USING A LOCAL POSITIONING SYSTEM

(71) Applicant: Shure Acquisition Holdings, Inc., Niles, IL (US)

(72) Inventors: Roger Stephen Grinnip, III, Lake Zurich, IL (US); Jordan Schultz, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 18/323,961

(22) Filed: May 25, 2023

(65) Prior Publication Data

US 2024/0031736 A1 Jan. 25, 2024

Related U.S. Application Data

(63) Continuation of application No. 17/303,388, filed on May 27, 2021, now Pat. No. 11,706,562.

(60) Provisional application No. 63/032,171, filed on May 29, 2020.

(51) Int. Cl.
*H04R 1/32* (2006.01)

(52) U.S. Cl.
CPC ....... *H04R 1/326* (2013.01); *H04R 2201/401* (2013.01); *H04R 2430/23* (2013.01)

(58) Field of Classification Search
None
See application file for complete search history.

(56) References Cited

U.S. PATENT DOCUMENTS

| | | | |
|---|---|---|---|
| 1,535,408 | A | 4/1925 | Fricke |
| 1,540,788 | A | 6/1925 | McClure |
| 1,965,830 | A | 7/1934 | Hammer |

(Continued)

FOREIGN PATENT DOCUMENTS

| | | |
|---|---|---|
| AU | 2004200802 | 3/2004 |
| CA | 2359771 | 4/2003 |

(Continued)

OTHER PUBLICATIONS

Double Condenser Microphone SM 69, Datasheet, Georg Neumann GmbH, available at <https://ende.neumann.com/product_files/7453/download>, 8 pp.

(Continued)

*Primary Examiner* — Kenny H Truong
(74) *Attorney, Agent, or Firm* — Neal, Gerber & Eisenberg LLP

(57) ABSTRACT

Transducer steering and configuration systems and methods using a local positioning system are provided. The position and/or orientation of transducers, devices, and/or objects within a physical environment may be utilized to enable steering of lobes and nulls of the transducers, to create self-assembling arrays of the transducers, and to enable monitoring and configuration of the transducers, devices, and objects through an augmented reality interface. The transducers and devices may be more optimally configured which can result in better capture of sound, better reproduction of sound, improved system performance, and increased user satisfaction.

22 Claims, 6 Drawing Sheets

(56) References Cited

U.S. PATENT DOCUMENTS

| | | | |
|---|---|---|---|
| 2,075,588 | A | 3/1937 | Meyers |
| 2,113,219 | A | 4/1938 | Olson |
| 2,164,655 | A | 7/1939 | Kleerup |
| D122,771 | S | 10/1940 | Doner |
| 2,233,412 | A | 3/1941 | Hill |
| 2,268,529 | A | 12/1941 | Stiles |
| 2,343,037 | A | 2/1944 | William, I |
| 2,377,449 | A | 6/1945 | Prevette |
| 2,481,250 | A | 9/1949 | Schneider |
| 2,521,603 | A | 9/1950 | Prew |
| 2,533,565 | A | 12/1950 | Eichelman |
| 2,539,671 | A | 1/1951 | Olson |
| 2,777,232 | A | 1/1957 | Kulicke |
| 2,828,508 | A | 4/1958 | Labarre |
| 2,840,181 | A | 6/1958 | Wildman |
| 2,882,633 | A | 4/1959 | Howell |
| 2,912,605 | A | 11/1959 | Tibbetts |
| 2,938,113 | A | 5/1960 | Schnell |
| 2,950,556 | A | 8/1960 | Larios |
| 3,019,854 | A | 2/1962 | Obryant |
| 3,132,713 | A | 5/1964 | Seeler |
| 3,143,182 | A | 8/1964 | Sears |
| 3,160,225 | A | 12/1964 | Sechrist |
| 3,161,975 | A | 12/1964 | McMillan |
| 3,205,601 | A | 9/1965 | Gawne |
| 3,239,973 | A | 3/1966 | Hannes |
| 3,240,883 | A | 3/1966 | Seeler |
| 3,310,901 | A | 3/1967 | Sarkisian |
| 3,321,170 | A | 5/1967 | Vye |
| 3,509,290 | A | 4/1970 | Mochida |
| 3,573,399 | A | 4/1971 | Schroeder |
| 3,657,490 | A | 4/1972 | Scheiber |
| 3,696,885 | A | 10/1972 | Grieg |
| 3,755,625 | A | 8/1973 | Maston |
| 3,828,508 | A | 8/1974 | Moeller |
| 3,857,191 | A | 12/1974 | Sadorus |
| 3,895,194 | A | 7/1975 | Fraim |
| 3,906,431 | A | 9/1975 | Clearwaters |
| D237,103 | S | 10/1975 | Fisher |
| 3,936,606 | A | 2/1976 | Wanke |
| 3,938,617 | A | 2/1976 | Forbes |
| 3,941,638 | A | 3/1976 | Horky |
| 3,992,584 | A | 11/1976 | Dugan |
| 4,007,461 | A | 2/1977 | Luedtke |
| 4,008,408 | A | 2/1977 | Kodama |
| 4,029,170 | A | 6/1977 | Phillips |
| 4,032,725 | A | 6/1977 | McGee |
| 4,070,547 | A | 1/1978 | Dellar |
| 4,072,821 | A | 2/1978 | Bauer |
| 4,096,353 | A | 6/1978 | Bauer |
| 4,127,156 | A | 11/1978 | Brandt |
| 4,131,760 | A | 12/1978 | Christensen |
| 4,169,219 | A | 9/1979 | Beard |
| 4,184,048 | A | 1/1980 | Alcaide |
| 4,198,705 | A | 4/1980 | Massa |
| D255,234 | S | 6/1980 | Wellward |
| D256,015 | S | 7/1980 | Doherty |
| 4,212,133 | A | 7/1980 | Lufkin |
| 4,237,339 | A | 12/1980 | Bunting |
| 4,244,096 | A | 1/1981 | Kashichi |
| 4,244,906 | A | 1/1981 | Heinemann |
| 4,254,417 | A | 3/1981 | Speiser |
| 4,275,694 | A | 6/1981 | Nagaishi |
| 4,296,280 | A | 10/1981 | Richie |
| 4,305,141 | A | 12/1981 | Massa |
| 4,308,425 | A | 12/1981 | Momose |
| 4,311,874 | A | 1/1982 | Wallace, Jr. |
| 4,330,691 | A | 5/1982 | Gordon |
| 4,334,740 | A | 6/1982 | Wray |
| 4,365,449 | A | 12/1982 | Liautaud |
| 4,373,191 | A | 2/1983 | Fette |
| 4,393,631 | A | 7/1983 | Krent |
| 4,414,433 | A | 11/1983 | Horie |
| 4,429,850 | A | 2/1984 | Weber |
| 4,436,966 | A | 3/1984 | Botros |
| 4,449,238 | A | 5/1984 | Lee |
| 4,466,117 | A | 8/1984 | Rudolf |
| 4,485,484 | A | 11/1984 | Flanagan |
| 4,489,442 | A | 12/1984 | Anderson |
| 4,518,826 | A | 5/1985 | Caudill |
| 4,521,908 | A | 6/1985 | Miyaji |
| 4,566,557 | A | 1/1986 | Lemaitre |
| 4,593,404 | A | 6/1986 | Bolin |
| 4,594,478 | A | 6/1986 | Gumb |
| D285,067 | S | 8/1986 | Delbuck |
| 4,625,827 | A | 12/1986 | Bartlett |
| 4,653,102 | A | 3/1987 | Hansen |
| 4,658,425 | A | 4/1987 | Julstrom |
| 4,669,108 | A | 5/1987 | Deinzer |
| 4,675,906 | A | 6/1987 | Sessler |
| 4,693,174 | A | 9/1987 | Anderson |
| 4,696,043 | A | 9/1987 | Iwahara |
| 4,712,231 | A | 12/1987 | Julstrom |
| 4,741,038 | A | 4/1988 | Elko |
| 4,752,961 | A | 6/1988 | Kahn |
| 4,768,086 | A | 8/1988 | Paist |
| 4,805,730 | A | 2/1989 | O'Neill |
| 4,815,132 | A | 3/1989 | Minami |
| 4,860,366 | A | 8/1989 | Fukushi |
| 4,862,507 | A | 8/1989 | Woodard |
| 4,866,868 | A | 9/1989 | Kass |
| 4,881,135 | A | 11/1989 | Heilweil |
| 4,888,807 | A | 12/1989 | Reichel |
| 4,903,247 | A | 2/1990 | Van Gerwen |
| 4,923,032 | A | 5/1990 | Nuernberger |
| 4,928,312 | A | 5/1990 | Hill |
| 4,969,197 | A | 11/1990 | Takaya |
| 5,000,286 | A | 3/1991 | Crawford |
| 5,038,935 | A | 8/1991 | Wenkman |
| 5,058,170 | A | 10/1991 | Kanamori |
| 5,088,574 | A | 2/1992 | Kertesz, III |
| D324,780 | S | 3/1992 | Sebesta |
| 5,121,426 | A | 6/1992 | Baumhauer |
| D329,239 | S | 9/1992 | Hahn |
| 5,189,701 | A | 2/1993 | Jain |
| 5,204,907 | A | 4/1993 | Staple |
| 5,214,709 | A | 5/1993 | Ribic |
| 5,224,170 | A | 6/1993 | Waite, Jr. |
| D340,718 | S | 10/1993 | Leger |
| 5,289,544 | A | 2/1994 | Franklin |
| D345,346 | S | 3/1994 | Alfonso |
| D345,379 | S | 3/1994 | Chan |
| 5,297,210 | A | 3/1994 | Julstrom |
| 5,322,979 | A | 6/1994 | Cassity |
| 5,323,459 | A | 6/1994 | Hirano |
| 5,329,593 | A | 7/1994 | Lazzeroni |
| 5,335,011 | A | 8/1994 | Addeo |
| 5,353,279 | A | 10/1994 | Koyama |
| 5,359,374 | A | 10/1994 | Schwartz |
| 5,371,789 | A | 12/1994 | Hirano |
| 5,383,293 | A | 1/1995 | Royal |
| 5,384,843 | A | 1/1995 | Masuda |
| 5,396,554 | A | 3/1995 | Hirano |
| 5,400,413 | A | 3/1995 | Kindel |
| D363,045 | S | 10/1995 | Phillips |
| 5,473,701 | A | 12/1995 | Cezanne |
| 5,509,634 | A | 4/1996 | Gebka |
| 5,513,265 | A | 4/1996 | Hirano |
| 5,525,765 | A | 6/1996 | Freiheit |
| 5,550,924 | A | 8/1996 | Helf |
| 5,550,925 | A | 8/1996 | Hori |
| 5,555,447 | A | 9/1996 | Kotzin |
| 5,574,793 | A | 11/1996 | Hirschhorn |
| 5,602,962 | A | 2/1997 | Kellermann |
| 5,633,936 | A | 5/1997 | Oh |
| 5,645,257 | A | 7/1997 | Ward |
| D382,118 | S | 8/1997 | Ferrero |
| 5,657,393 | A | 8/1997 | Crow |
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |

(56) References Cited

U.S. PATENT DOCUMENTS

| | | | |
|---|---|---|---|
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |
| 5,878,147 | A | 3/1999 | Killion |
| 5,888,412 | A | 3/1999 | Sooriakumar |
| 5,888,439 | A | 3/1999 | Miller |
| D416,315 | S | 11/1999 | Nanjo |
| 5,978,211 | A | 11/1999 | Hong |
| 5,991,277 | A | 11/1999 | Maeng |
| 6,035,962 | A | 3/2000 | Lin |
| 6,039,457 | A | 3/2000 | O'Neal |
| 6,041,127 | A | 3/2000 | Elko |
| 6,049,607 | A | 4/2000 | Marash |
| D424,538 | S | 5/2000 | Hayashi |
| 6,069,961 | A | 5/2000 | Nakazawa |
| 6,125,179 | A | 9/2000 | Wu |
| D432,518 | S | 10/2000 | Muto |
| 6,128,395 | A | 10/2000 | De Vries |
| 6,137,887 | A | 10/2000 | Anderson |
| 6,144,746 | A | 11/2000 | Azima |
| 6,151,399 | A | 11/2000 | Killion |
| 6,173,059 | B1 | 1/2001 | Huang |
| 6,198,831 | B1 | 3/2001 | Azima |
| 6,205,224 | B1 | 3/2001 | Underbrink |
| 6,215,881 | B1 | 4/2001 | Azima |
| 6,266,427 | B1 | 7/2001 | Mathur |
| 6,285,770 | B1 | 9/2001 | Azima |
| 6,301,357 | B1 | 10/2001 | Romesburg |
| 6,329,908 | B1 | 12/2001 | Frecska |
| 6,332,029 | B1 | 12/2001 | Azima |
| D453,016 | S | 1/2002 | Nevill |
| 6,386,315 | B1 | 5/2002 | Roy |
| 6,393,129 | B1 | 5/2002 | Conrad |
| 6,424,635 | B1 | 7/2002 | Song |
| 6,442,272 | B1 | 8/2002 | Osovets |
| 6,449,593 | B1 | 9/2002 | Valve |
| 6,481,173 | B1 | 11/2002 | Roy |
| 6,488,367 | B1 | 12/2002 | Debesis |
| D469,090 | S | 1/2003 | Tsuji |
| 6,505,057 | B1 | 1/2003 | Finn |
| 6,507,659 | B1 | 1/2003 | Iredale |
| 6,510,919 | B1 | 1/2003 | Roy |
| 6,526,147 | B1 | 2/2003 | Rung |
| 6,556,682 | B1 | 4/2003 | Gilloire |
| 6,592,237 | B1 | 7/2003 | Pledger |
| 6,622,030 | B1 | 9/2003 | Romesburg |
| D480,923 | S | 10/2003 | Neubourg |
| 6,633,647 | B1 | 10/2003 | Markow |
| 6,665,971 | B2 | 12/2003 | Lowry |
| 6,694,028 | B1 | 2/2004 | Matsuo |
| 6,704,422 | B1 | 3/2004 | Jensen |
| D489,707 | S | 5/2004 | Kobayashi |
| 6,731,334 | B1 | 5/2004 | Maeng |
| 6,741,720 | B1 | 5/2004 | Myatt |
| 6,757,393 | B1 | 6/2004 | Spitzer |
| 6,768,795 | B2 | 7/2004 | Jimen |
| 6,868,377 | B1 | 3/2005 | Laroche |
| 6,885,750 | B2 | 4/2005 | Egelmeers |
| 6,885,986 | B1 | 4/2005 | Gigi |
| D504,889 | S | 5/2005 | Andre |
| 6,889,183 | B1 | 5/2005 | Gunduzhan |
| 6,895,093 | B1 | 5/2005 | Ali |
| 6,931,123 | B1 | 8/2005 | Hughes |
| 6,944,312 | B2 | 9/2005 | Mason |
| D510,729 | S | 10/2005 | Chen |
| 6,968,064 | B1 | 11/2005 | Ning |
| 6,990,193 | B2 | 1/2006 | Beaucoup |
| 6,993,126 | B1 | 1/2006 | Kyrylenko |
| 6,993,145 | B2 | 1/2006 | Combest |
| 7,003,099 | B1 | 2/2006 | Zhang |
| 7,013,267 | B1 | 3/2006 | Huart |
| 7,031,269 | B2 | 4/2006 | Lee |
| 7,035,398 | B2 | 4/2006 | Matsuo |
| 7,035,415 | B2 | 4/2006 | Belt |
| 7,050,576 | B2 | 5/2006 | Zhang |
| 7,054,451 | B2 | 5/2006 | Janse |
| D526,643 | S | 8/2006 | Ishizaki |
| D527,372 | S | 8/2006 | Allen |
| 7,092,516 | B2 | 8/2006 | Furuta |
| 7,092,882 | B2 | 8/2006 | Arrowood |
| 7,098,865 | B2 | 8/2006 | Christensen |
| 7,106,876 | B2 | 9/2006 | Santiago |
| 7,120,269 | B2 | 10/2006 | Lowell |
| 7,130,309 | B2 | 10/2006 | Boaz |
| D533,177 | S | 12/2006 | Andre |
| 7,149,320 | B2 | 12/2006 | Haykin |
| 7,161,534 | B2 | 1/2007 | Tsai |
| 7,187,765 | B2 | 3/2007 | Popovic |
| 7,203,308 | B2 | 4/2007 | Kubota |
| D542,543 | S | 5/2007 | Bruce |
| 7,212,628 | B2 | 5/2007 | Mirjana |
| D546,318 | S | 7/2007 | Yoon |
| D546,814 | S | 7/2007 | Takita |
| D547,748 | S | 7/2007 | Tsuge |
| 7,239,714 | B2 | 7/2007 | De Blok |
| D549,673 | S | 8/2007 | Niitsu |
| 7,269,263 | B2 | 9/2007 | Dedieu |
| D552,570 | S | 10/2007 | Niitsu |
| D559,553 | S | 1/2008 | James |
| 7,333,476 | B2 | 2/2008 | LeBlanc |
| D566,685 | S | 4/2008 | Koller |
| 7,359,504 | B1 | 4/2008 | Reuss |
| 7,366,310 | B2 | 4/2008 | Stinson |
| 7,387,151 | B1 | 6/2008 | Payne |
| 7,412,376 | B2 | 8/2008 | Florencio |
| 7,415,117 | B2 | 8/2008 | Tashev |
| D578,509 | S | 10/2008 | Thomas |
| D581,510 | S | 11/2008 | Albano |
| D582,391 | S | 12/2008 | Morimoto |
| D587,709 | S | 3/2009 | Niitsu |
| D589,605 | S | 3/2009 | Reedy |
| 7,503,616 | B2 | 3/2009 | Linhard |
| 7,515,719 | B2 | 4/2009 | Hooley |
| 7,536,769 | B2 | 5/2009 | Pedersen |
| D595,402 | S | 6/2009 | Miyake |
| D595,736 | S | 7/2009 | Son |
| 7,558,381 | B1 | 7/2009 | Ali |
| 7,561,700 | B1 | 7/2009 | Bernardi |
| 7,565,949 | B2 | 7/2009 | Tojo |
| D601,585 | S | 10/2009 | Andre |
| 7,651,390 | B1 | 1/2010 | Profeta |
| 7,660,428 | B2 | 2/2010 | Rodman |
| 7,667,728 | B2 | 2/2010 | Kenoyer |
| 7,672,445 | B1 | 3/2010 | Zhang |
| D613,338 | S | 4/2010 | Marukos |
| 7,701,110 | B2 | 4/2010 | Fukuda |
| 7,702,116 | B2 | 4/2010 | Stone |
| D614,871 | S | 5/2010 | Tang |
| 7,724,891 | B2 | 5/2010 | Beaucoup |
| D617,441 | S | 6/2010 | Koury |
| 7,747,001 | B2 | 6/2010 | Kellermann |
| 7,756,278 | B2 | 7/2010 | Moorer |
| 7,783,063 | B2 | 8/2010 | Pocino |
| 7,787,328 | B2 | 8/2010 | Chu |
| 7,830,862 | B2 | 11/2010 | James |
| 7,831,035 | B2 | 11/2010 | Stokes |
| 7,831,036 | B2 | 11/2010 | Beaucoup |
| 7,856,097 | B2 | 12/2010 | Tokuda |
| 7,881,486 | B1 | 2/2011 | Killion |
| 7,894,421 | B2 | 2/2011 | Kwan |
| D636,188 | S | 4/2011 | Kim |
| 7,925,006 | B2 | 4/2011 | Hirai |
| 7,925,007 | B2 | 4/2011 | Stokes |
| 7,936,886 | B2 | 5/2011 | Kim |
| 7,970,123 | B2 | 6/2011 | Beaucoup |
| 7,970,151 | B2 | 6/2011 | Oxford |
| D642,385 | S | 8/2011 | Lee |
| D643,015 | S | 8/2011 | Kim |
| 7,991,167 | B2 | 8/2011 | Oxford |

(56) References Cited

U.S. PATENT DOCUMENTS

| | | | |
|---|---|---|---|
| 7,995,768 | B2 | 8/2011 | Miki |
| 8,000,481 | B2 | 8/2011 | Nishikawa |
| 8,005,238 | B2 | 8/2011 | Tashev |
| 8,019,091 | B2 | 9/2011 | Burnett |
| 8,041,054 | B2 | 10/2011 | Yeldener |
| 8,059,843 | B2 | 11/2011 | Hung |
| 8,064,629 | B2 | 11/2011 | Jiang |
| 8,085,947 | B2 | 12/2011 | Haulick |
| 8,085,949 | B2 | 12/2011 | Kim |
| 8,095,120 | B1 | 1/2012 | Blair |
| 8,098,842 | B2 | 1/2012 | Florencio |
| 8,098,844 | B2 | 1/2012 | Elko |
| 8,103,030 | B2 | 1/2012 | Barthel |
| 8,109,360 | B2 | 2/2012 | Stewart, Jr. |
| 8,112,272 | B2 | 2/2012 | Nagahama |
| 8,116,500 | B2 | 2/2012 | Oxford |
| 8,121,834 | B2 | 2/2012 | Rosec |
| D655,271 | S | 3/2012 | Park |
| D656,473 | S | 3/2012 | Laube |
| 8,130,969 | B2 | 3/2012 | Buck |
| 8,130,977 | B2 | 3/2012 | Chu |
| 8,135,143 | B2 | 3/2012 | Ishibashi |
| 8,144,886 | B2 | 3/2012 | Ishibashi |
| D658,153 | S | 4/2012 | Woo |
| 8,155,331 | B2 | 4/2012 | Nakadai |
| 8,170,882 | B2 | 5/2012 | Davis |
| 8,175,291 | B2 | 5/2012 | Chan |
| 8,175,871 | B2 | 5/2012 | Wang |
| 8,184,801 | B1 | 5/2012 | Hamalainen |
| 8,189,765 | B2 | 5/2012 | Nishikawa |
| 8,189,810 | B2 | 5/2012 | Wolff |
| 8,194,863 | B2 | 6/2012 | Takumai |
| 8,199,927 | B1 | 6/2012 | Raftery |
| 8,204,198 | B2 | 6/2012 | Adeney |
| 8,204,248 | B2 | 6/2012 | Haulick |
| 8,208,664 | B2 | 6/2012 | Iwasaki |
| 8,213,596 | B2 | 7/2012 | Beaucoup |
| 8,213,634 | B1 | 7/2012 | Daniel |
| 8,219,387 | B2 | 7/2012 | Cutler |
| 8,229,134 | B2 | 7/2012 | Duraiswami |
| 8,233,352 | B2 | 7/2012 | Beaucoup |
| 8,243,951 | B2 | 8/2012 | Ishibashi |
| 8,244,536 | B2 | 8/2012 | Arun |
| 8,249,273 | B2 | 8/2012 | Inoda |
| 8,259,959 | B2 | 9/2012 | Marton |
| 8,275,120 | B2 | 9/2012 | Stokes, III |
| 8,280,728 | B2 | 10/2012 | Chen |
| 8,284,949 | B2 | 10/2012 | Farhang |
| 8,284,952 | B2 | 10/2012 | Reining |
| 8,286,749 | B2 | 10/2012 | Stewart |
| 8,290,142 | B1 | 10/2012 | Lambert |
| 8,291,670 | B2 | 10/2012 | Gard |
| 8,297,402 | B2 | 10/2012 | Stewart |
| 8,315,380 | B2 | 11/2012 | Liu |
| 8,331,582 | B2 | 12/2012 | Steele |
| 8,345,898 | B2 | 1/2013 | Reining |
| 8,355,521 | B2 | 1/2013 | Larson |
| 8,370,140 | B2 | 2/2013 | Guillaume |
| 8,379,823 | B2 | 2/2013 | Ratmanski |
| 8,385,557 | B2 | 2/2013 | Tashev |
| D678,329 | S | 3/2013 | Lee |
| 8,395,653 | B2 | 3/2013 | Feng |
| 8,403,107 | B2 | 3/2013 | Stewart |
| 8,406,436 | B2 | 3/2013 | Craven |
| 8,428,661 | B2 | 4/2013 | Chen |
| 8,433,061 | B2 | 4/2013 | Cutler |
| D682,266 | S | 5/2013 | Wu |
| 8,437,490 | B2 | 5/2013 | Marton |
| 8,443,930 | B2 | 5/2013 | Stewart, Jr. |
| 8,447,590 | B2 | 5/2013 | Ishibashi |
| 8,472,639 | B2 | 6/2013 | Reining |
| 8,472,640 | B2 | 6/2013 | Marton |
| D685,346 | S | 7/2013 | Szymanski |
| D686,182 | S | 7/2013 | Ashiwa |
| 8,479,871 | B2 | 7/2013 | Stewart |
| 8,483,398 | B2 | 7/2013 | Fozunbal |
| 8,498,423 | B2 | 7/2013 | Thaden |
| D687,432 | S | 8/2013 | Duan |
| 8,503,653 | B2 | 8/2013 | Ahuja |
| 8,515,089 | B2 | 8/2013 | Nicholson |
| 8,515,109 | B2 | 8/2013 | Dittberner |
| 8,526,633 | B2 | 9/2013 | Ukai |
| 8,553,904 | B2 | 10/2013 | Said |
| 8,559,611 | B2 | 10/2013 | Ratmanski |
| D693,328 | S | 11/2013 | Goetzen |
| 8,583,481 | B2 | 11/2013 | Walter |
| 8,599,194 | B2 | 12/2013 | Lewis |
| 8,600,443 | B2 | 12/2013 | Kawaguchi |
| 8,605,890 | B2 | 12/2013 | Zhang |
| 8,620,650 | B2 | 12/2013 | Walters |
| 8,630,431 | B2 | 1/2014 | Gran |
| 8,631,897 | B2 | 1/2014 | Stewart |
| 8,634,569 | B2 | 1/2014 | Lu |
| 8,638,951 | B2 | 1/2014 | Zurek |
| D699,712 | S | 2/2014 | Bourne |
| 8,644,477 | B2 | 2/2014 | Gilbert |
| 8,654,955 | B1 | 2/2014 | Lambert |
| 8,654,990 | B2 | 2/2014 | Faller |
| 8,660,274 | B2 | 2/2014 | Wolff |
| 8,660,275 | B2 | 2/2014 | Buck |
| 8,670,581 | B2 | 3/2014 | Harman |
| 8,672,087 | B2 | 3/2014 | Stewart |
| 8,675,890 | B2 | 3/2014 | Schmidt |
| 8,675,899 | B2 | 3/2014 | Jung |
| 8,676,728 | B1 | 3/2014 | Velusamy |
| 8,682,675 | B2 | 3/2014 | Togami |
| 8,724,829 | B2 | 5/2014 | Erik |
| 8,730,156 | B2 | 5/2014 | Weising |
| 8,744,069 | B2 | 6/2014 | Cutler |
| 8,744,101 | B1 | 6/2014 | Burns |
| 8,755,536 | B2 | 6/2014 | Chen |
| 8,787,560 | B2 | 7/2014 | Buck |
| 8,811,601 | B2 | 8/2014 | Mohammad |
| 8,818,002 | B2 | 8/2014 | Tashev |
| 8,824,693 | B2 | 9/2014 | Per |
| 8,842,851 | B2 | 9/2014 | Beaucoup |
| 8,855,326 | B2 | 10/2014 | Derkx |
| 8,855,327 | B2 | 10/2014 | Tanaka |
| 8,861,713 | B2 | 10/2014 | Xu |
| 8,861,756 | B2 | 10/2014 | Zhu |
| 8,873,789 | B2 | 10/2014 | Bigeh |
| D717,272 | S | 11/2014 | Kim |
| 8,886,343 | B2 | 11/2014 | Ishibashi |
| 8,893,849 | B2 | 11/2014 | Hudson |
| 8,898,633 | B2 | 11/2014 | Bryant |
| D718,731 | S | 12/2014 | Lee |
| 8,903,106 | B2 | 12/2014 | Meyer |
| 8,923,529 | B2 | 12/2014 | McCowan |
| 8,929,564 | B2 | 1/2015 | Kikkeri |
| 8,942,382 | B2 | 1/2015 | Elko |
| 8,965,546 | B2 | 2/2015 | Erik |
| D725,059 | S | 3/2015 | Kim |
| D725,631 | S | 3/2015 | McNamara |
| 8,976,977 | B2 | 3/2015 | De |
| 8,983,089 | B1 | 3/2015 | Chu |
| 8,983,834 | B2 | 3/2015 | Davis |
| D726,144 | S | 4/2015 | Kang |
| D727,968 | S | 4/2015 | Onoue |
| 9,002,028 | B2 | 4/2015 | Haulick |
| D729,767 | S | 5/2015 | Lee |
| 9,038,301 | B2 | 5/2015 | Zelbacher |
| 9,088,336 | B2 | 7/2015 | Mani |
| 9,094,496 | B2 | 7/2015 | Teutsch |
| D735,717 | S | 8/2015 | Lam |
| D737,245 | S | 8/2015 | Fan |
| 9,099,094 | B2 | 8/2015 | Burnett |
| 9,107,001 | B2 | 8/2015 | Diethorn |
| 9,111,543 | B2 | 8/2015 | Per |
| 9,113,242 | B2 | 8/2015 | Hyun |
| 9,113,247 | B2 | 8/2015 | Chatlani |
| 9,126,827 | B2 | 9/2015 | Hsieh |
| 9,129,223 | B1 | 9/2015 | Velusamy |
| 9,140,054 | B2 | 9/2015 | Oberbroeckling |
| D740,279 | S | 10/2015 | Wu |

(56) References Cited

U.S. PATENT DOCUMENTS 9,172,345 B2 10/2015 Kok
D743,376 S 11/2015 Kim
D743,939 S 11/2015 Seong
9,196,261 B2 11/2015 Burnett
9,197,974 B1 11/2015 Clark
9,203,494 B2 12/2015 Tarighat Mehrabani
9,215,327 B2 12/2015 Bathurst
9,215,543 B2 12/2015 Sun
9,226,062 B2 12/2015 Sun
9,226,070 B2 12/2015 Hyun
9,226,088 B2 12/2015 Pandey
9,232,185 B2 1/2016 Graham
9,237,391 B2 1/2016 Benesty
9,247,367 B2 1/2016 Nobile
9,253,567 B2 2/2016 Morcelli
9,257,132 B2 2/2016 Gowreesunker
9,264,553 B2 2/2016 Pandey
9,264,805 B2 2/2016 Buck
9,280,985 B2 3/2016 Tawada
9,286,908 B2 3/2016 Zhang
9,294,839 B2 3/2016 Lambert
9,301,049 B2 3/2016 Elko
D754,103 S 4/2016 Fischer
9,307,326 B2 4/2016 Elko
9,319,532 B2 4/2016 Bao
9,319,799 B2 4/2016 Salmon
9,326,060 B2 4/2016 Nicholson
D756,502 S 5/2016 Lee
9,330,673 B2 5/2016 Cho
9,338,301 B2 5/2016 Pocino
9,338,549 B2 5/2016 Haulick
9,354,310 B2 5/2016 Erik
9,357,080 B2 5/2016 Beaucoup
9,403,670 B2 8/2016 Schelling
9,426,598 B2 8/2016 Walsh
D767,748 S 9/2016 Nakai
9,451,078 B2 9/2016 Yang
D769,239 S 10/2016 Li
9,462,378 B2 10/2016 Kuech
9,473,868 B2 10/2016 Huang
9,479,627 B1 10/2016 Rung
9,479,885 B1 10/2016 Ivanov
9,489,948 B1 11/2016 Chu
9,510,090 B2 11/2016 Lissek
9,514,723 B2 12/2016 Silfvast
9,516,412 B2 12/2016 Shigenaga
9,521,057 B2 12/2016 Klingbeil
9,549,245 B2 1/2017 Frater
9,560,446 B1 1/2017 Chang
9,560,451 B2 1/2017 Eichfeld
9,565,493 B2 2/2017 Abraham
9,565,507 B2 2/2017 Case
9,578,413 B2 2/2017 Sawa
9,578,440 B2 2/2017 Otto
9,589,556 B2 3/2017 Gao
9,591,123 B2 3/2017 Sorensen
9,591,404 B1 3/2017 Chhetri
D784,299 S 4/2017 Cho
9,615,173 B2 4/2017 Sako
9,628,596 B1 4/2017 Bullough
9,635,186 B2 4/2017 Pandey
9,635,474 B2 4/2017 Kuster
D787,481 S 5/2017 Jorunn
D788,073 S 5/2017 Silvera
9,640,187 B2 5/2017 Niemisto
9,641,688 B2 5/2017 Pandey
9,641,929 B2 5/2017 Li
9,641,935 B1 5/2017 Ivanov
9,653,091 B2 5/2017 Matsuo
9,653,092 B2 5/2017 Sun
9,655,001 B2 5/2017 Metzger
9,659,576 B1 5/2017 Kotvis
D789,323 S 6/2017 Mackiewicz
9,674,604 B2 6/2017 Deroo
9,692,882 B2 6/2017 Mani
9,706,057 B2 7/2017 Mani
9,716,944 B2 7/2017 Yliaho
9,721,582 B1 8/2017 Huang
9,734,835 B2 8/2017 Fujieda
9,754,572 B2 9/2017 Salazar
9,761,243 B2 9/2017 Taenzer
D801,285 S 10/2017 Timmins
9,788,119 B2 10/2017 Miikka
9,813,806 B2 11/2017 Graham
9,818,426 B2 11/2017 Kotera
9,826,211 B2 11/2017 Sawa
9,854,101 B2 12/2017 Pandey
9,854,363 B2 12/2017 Sladeczek
9,860,439 B2 1/2018 Sawa
9,866,952 B2 1/2018 Pandey
D811,393 S 2/2018 Ahn
9,894,434 B2 2/2018 Rollow, IV
9,930,448 B1 3/2018 Chen
9,936,290 B2 4/2018 Mohammad
9,966,059 B1 5/2018 Ayrapetian
9,973,848 B2 5/2018 Chhetri
9,980,042 B1 5/2018 Benattar
D819,607 S 6/2018 Chui
D819,631 S 6/2018 Matsumiya
10,015,589 B1 7/2018 Ebenezer
10,021,506 B2 7/2018 Johnson
10,021,515 B1 7/2018 Mallya
10,034,116 B2 7/2018 Kadri
10,038,769 B2 7/2018 Ukai
10,054,320 B2 8/2018 Choi
10,061,009 B1 8/2018 Family
10,062,379 B2 8/2018 Katuri
10,153,744 B1 12/2018 Every
10,165,386 B2 12/2018 Lehtiniemi
D841,589 S 2/2019 Andreas
10,206,030 B2 2/2019 Matsumoto
10,210,882 B1 2/2019 McCowan
10,231,062 B2 3/2019 Pedersen
10,244,121 B2 3/2019 Mani
10,244,219 B2 3/2019 Sawa
10,269,343 B2 4/2019 Wingate
10,366,702 B2 7/2019 Morton
10,367,948 B2 7/2019 Wells-Rutherford
D857,873 S 8/2019 Shimada
10,389,861 B2 8/2019 Mani
10,389,885 B2 8/2019 Sun
D860,319 S 9/2019 Beruto
D860,997 S 9/2019 Jhun
D864,136 S 10/2019 Kim
10,433,086 B1 * 10/2019 Juszkiewicz ......... H04R 29/002
10,440,469 B2 10/2019 Barnett
D865,723 S 11/2019 Cho
10,566,008 B2 2/2020 Thorpe
10,602,267 B2 3/2020 Grosche
D883,952 S 5/2020 Lucas
10,650,797 B2 5/2020 Kumar
D888,020 S 6/2020 Lyu
10,728,653 B2 7/2020 Graham
D900,070 S 10/2020 Lantz
D900,071 S 10/2020 Lantz
D900,072 S 10/2020 Lantz
D900,073 S 10/2020 Lantz
D900,074 S 10/2020 Lantz
10,827,263 B2 11/2020 Christoph
10,863,270 B1 12/2020 Cornelius
10,930,297 B2 2/2021 Christoph
10,959,018 B1 3/2021 Shi
10,979,805 B2 4/2021 Chowdhary
D924,189 S 7/2021 Park
11,109,133 B2 8/2021 Lantz
D940,116 S 1/2022 Cho
11,218,802 B1 1/2022 Kandadai
2001/0031058 A1 10/2001 Anderson
2002/0015500 A1 2/2002 Belt
2002/0041679 A1 4/2002 Beaucoup
2002/0048377 A1 4/2002 Vaudrey
2002/0064158 A1 5/2002 Yokoyama
2002/0064287 A1 5/2002 Kawamura
2002/0069054 A1 6/2002 Arrowood

(56) References Cited

U.S. PATENT DOCUMENTS

| | | | |
|---|---|---|---|
| 2002/0110255 | A1 | 8/2002 | Killion |
| 2002/0126861 | A1 | 9/2002 | Colby |
| 2002/0131580 | A1 | 9/2002 | Smith |
| 2002/0140633 | A1 | 10/2002 | Rafii |
| 2002/0146282 | A1 | 10/2002 | Wilkes |
| 2002/0149070 | A1 | 10/2002 | Sheplak |
| 2002/0159603 | A1 | 10/2002 | Hirai |
| 2003/0026437 | A1 | 2/2003 | Janse |
| 2003/0053639 | A1 | 3/2003 | Beaucoup |
| 2003/0059061 | A1 | 3/2003 | Tsuji |
| 2003/0063762 | A1 | 4/2003 | Tajima |
| 2003/0063768 | A1 | 4/2003 | Cornelius |
| 2003/0072461 | A1 | 4/2003 | Moorer |
| 2003/0107478 | A1 | 6/2003 | Hendricks |
| 2003/0118200 | A1 | 6/2003 | Beaucoup |
| 2003/0122777 | A1 | 7/2003 | Grover |
| 2003/0138119 | A1 | 7/2003 | Pocino |
| 2003/0156725 | A1 | 8/2003 | Boone |
| 2003/0161485 | A1 | 8/2003 | Smith |
| 2003/0163326 | A1 | 8/2003 | Maase |
| 2003/0169888 | A1 | 9/2003 | Subotic |
| 2003/0185404 | A1 | 10/2003 | Milsap |
| 2003/0198339 | A1 | 10/2003 | Roy |
| 2003/0198359 | A1 | 10/2003 | Killion |
| 2003/0202107 | A1 | 10/2003 | Slattery |
| 2004/0013038 | A1 | 1/2004 | Kajala |
| 2004/0013252 | A1 | 1/2004 | Craner |
| 2004/0076305 | A1 | 4/2004 | Santiago |
| 2004/0105557 | A1 | 6/2004 | Matsuo |
| 2004/0125942 | A1 | 7/2004 | Beaucoup |
| 2004/0175006 | A1 | 9/2004 | Kim |
| 2004/0202345 | A1 | 10/2004 | Stenberg |
| 2004/0240664 | A1 | 12/2004 | Freed |
| 2005/0005494 | A1 | 1/2005 | Way |
| 2005/0041530 | A1 | 2/2005 | Goudie |
| 2005/0069156 | A1 | 3/2005 | Haapapuro |
| 2005/0094580 | A1 | 5/2005 | Kumar |
| 2005/0094795 | A1 | 5/2005 | Rambo |
| 2005/0149320 | A1 | 7/2005 | Kajala |
| 2005/0157897 | A1 | 7/2005 | Saltykov |
| 2005/0175189 | A1 | 8/2005 | Lee |
| 2005/0175190 | A1 | 8/2005 | Tashev |
| 2005/0213747 | A1 | 9/2005 | Popovich |
| 2005/0221867 | A1 | 10/2005 | Zurek |
| 2005/0238196 | A1 | 10/2005 | Furuno |
| 2005/0270906 | A1 | 12/2005 | Ramenzoni |
| 2005/0271221 | A1 | 12/2005 | Cerwin |
| 2005/0286698 | A1 | 12/2005 | Bathurst |
| 2005/0286729 | A1 | 12/2005 | Harwood |
| 2006/0083390 | A1 | 4/2006 | Kaderavek |
| 2006/0088173 | A1 | 4/2006 | Rodman |
| 2006/0093128 | A1 | 5/2006 | Oxford |
| 2006/0098403 | A1 | 5/2006 | Smith |
| 2006/0104458 | A1 | 5/2006 | Kenoyer |
| 2006/0109983 | A1 | 5/2006 | Young |
| 2006/0151256 | A1 | 7/2006 | Lee |
| 2006/0159293 | A1 | 7/2006 | Azima |
| 2006/0161430 | A1 | 7/2006 | Schweng |
| 2006/0165242 | A1 | 7/2006 | Miki |
| 2006/0192976 | A1 | 8/2006 | Hall |
| 2006/0198541 | A1 | 9/2006 | Henry |
| 2006/0204022 | A1 | 9/2006 | Hooley |
| 2006/0215866 | A1 | 9/2006 | Francisco |
| 2006/0222187 | A1 | 10/2006 | Jarrett |
| 2006/0233353 | A1 | 10/2006 | Beaucoup |
| 2006/0239471 | A1 | 10/2006 | Mao |
| 2006/0262942 | A1 | 11/2006 | Oxford |
| 2006/0269080 | A1 | 11/2006 | Oxford |
| 2006/0269086 | A1 | 11/2006 | Page |
| 2007/0006474 | A1 | 1/2007 | Taniguchi |
| 2007/0009116 | A1 | 1/2007 | Reining |
| 2007/0019828 | A1 | 1/2007 | Hughes |
| 2007/0053524 | A1 | 3/2007 | Haulick |
| 2007/0093714 | A1 | 4/2007 | Beaucoup |
| 2007/0116255 | A1 | 5/2007 | Derkx |
| 2007/0120029 | A1 | 5/2007 | Keung |
| 2007/0165871 | A1 | 7/2007 | Roovers |
| 2007/0230712 | A1 | 10/2007 | Belt |
| 2007/0253561 | A1 | 11/2007 | Williams |
| 2007/0269066 | A1 | 11/2007 | Derleth |
| 2008/0008339 | A1 | 1/2008 | Ryan |
| 2008/0033723 | A1 | 2/2008 | Jang |
| 2008/0046235 | A1 | 2/2008 | Chen |
| 2008/0056517 | A1 | 3/2008 | Algazi |
| 2008/0101622 | A1 | 5/2008 | Sugiyama |
| 2008/0130907 | A1 | 6/2008 | Sudo |
| 2008/0144848 | A1 | 6/2008 | Buck |
| 2008/0152167 | A1 | 6/2008 | Taenzer |
| 2008/0168283 | A1 | 7/2008 | Penning |
| 2008/0188965 | A1 | 8/2008 | Bruey |
| 2008/0212805 | A1 | 9/2008 | Fincham |
| 2008/0232607 | A1 | 9/2008 | Tashev |
| 2008/0247567 | A1 | 10/2008 | Morgan |
| 2008/0253553 | A1 | 10/2008 | Li |
| 2008/0253589 | A1 | 10/2008 | Trahms |
| 2008/0259731 | A1 | 10/2008 | Happonen |
| 2008/0260175 | A1 | 10/2008 | Elko |
| 2008/0279400 | A1 | 11/2008 | Knoll |
| 2008/0285772 | A1 | 11/2008 | Haulick |
| 2009/0003586 | A1 | 1/2009 | Lai |
| 2009/0030536 | A1 | 1/2009 | Gur |
| 2009/0052684 | A1 | 2/2009 | Ishibashi |
| 2009/0086998 | A1 | 4/2009 | Jeong |
| 2009/0087000 | A1 | 4/2009 | Ko |
| 2009/0087001 | A1 | 4/2009 | Jiang |
| 2009/0094817 | A1 | 4/2009 | Killion |
| 2009/0129609 | A1 | 5/2009 | Oh |
| 2009/0147967 | A1 | 6/2009 | Ishibashi |
| 2009/0150149 | A1 | 6/2009 | Cutter |
| 2009/0161880 | A1 | 6/2009 | Hooley |
| 2009/0169027 | A1 | 7/2009 | Ura |
| 2009/0173030 | A1 | 7/2009 | Gulbrandsen |
| 2009/0173570 | A1 | 7/2009 | Levit |
| 2009/0226004 | A1 | 9/2009 | Moeller |
| 2009/0233545 | A1 | 9/2009 | Sutskover |
| 2009/0237561 | A1 | 9/2009 | Kobayashi |
| 2009/0254340 | A1 | 10/2009 | Sun |
| 2009/0274318 | A1 | 11/2009 | Ishibashi |
| 2009/0287482 | A1 | 11/2009 | Hetherington |
| 2009/0310794 | A1 | 12/2009 | Ishibashi |
| 2010/0011644 | A1 | 1/2010 | Kramer |
| 2010/0034397 | A1 | 2/2010 | Nakadai |
| 2010/0074433 | A1 | 3/2010 | Zhang |
| 2010/0111323 | A1 | 5/2010 | Marton |
| 2010/0111324 | A1 | 5/2010 | Yeldener |
| 2010/0119097 | A1 | 5/2010 | Ohtsuka |
| 2010/0123785 | A1 | 5/2010 | Chen |
| 2010/0128892 | A1 | 5/2010 | Chen |
| 2010/0128901 | A1 | 5/2010 | Herman |
| 2010/0131749 | A1 | 5/2010 | Kim |
| 2010/0142721 | A1 | 6/2010 | Wada |
| 2010/0150364 | A1 | 6/2010 | Buck |
| 2010/0158268 | A1 | 6/2010 | Marton |
| 2010/0165071 | A1 | 7/2010 | Ishibashi |
| 2010/0166219 | A1 | 7/2010 | Marton |
| 2010/0189275 | A1 | 7/2010 | Christoph |
| 2010/0189299 | A1 | 7/2010 | Grant |
| 2010/0202628 | A1 | 8/2010 | Meyer |
| 2010/0208605 | A1 | 8/2010 | Wang |
| 2010/0215184 | A1 | 8/2010 | Buck |
| 2010/0215189 | A1 | 8/2010 | Marton |
| 2010/0217590 | A1 | 8/2010 | Nemer |
| 2010/0245624 | A1 | 9/2010 | Beaucoup |
| 2010/0246873 | A1 | 9/2010 | Chen |
| 2010/0284185 | A1 | 11/2010 | Ngai |
| 2010/0305728 | A1 | 12/2010 | Aiso |
| 2010/0314513 | A1 | 12/2010 | Evans |
| 2011/0002469 | A1 | 1/2011 | Ojala |
| 2011/0007921 | A1 | 1/2011 | Stewart |
| 2011/0033063 | A1 | 2/2011 | McGrath |
| 2011/0038229 | A1 | 2/2011 | Beaucoup |
| 2011/0096136 | A1 | 4/2011 | Liu |
| 2011/0096631 | A1 | 4/2011 | Kondo |
| 2011/0096915 | A1 | 4/2011 | Nemer |

(56) References Cited

U.S. PATENT DOCUMENTS

| | | | |
|---|---|---|---|
| 2011/0164761 | A1 | 7/2011 | McCowan |
| 2011/0194719 | A1 | 8/2011 | Frater |
| 2011/0211706 | A1 | 9/2011 | Tanaka |
| 2011/0235821 | A1 | 9/2011 | Okita |
| 2011/0268287 | A1 | 11/2011 | Ishibashi |
| 2011/0311064 | A1 | 12/2011 | Teutsch |
| 2011/0311085 | A1 | 12/2011 | Stewart |
| 2011/0317862 | A1 | 12/2011 | Hosoe |
| 2012/0002835 | A1 | 1/2012 | Stewart |
| 2012/0014049 | A1 | 1/2012 | Ogle |
| 2012/0027227 | A1 | 2/2012 | Kok |
| 2012/0070015 | A1 | 3/2012 | Oh |
| 2012/0076316 | A1 | 3/2012 | Zhu |
| 2012/0080260 | A1 | 4/2012 | Stewart |
| 2012/0093344 | A1 | 4/2012 | Sun |
| 2012/0117474 | A1 | 5/2012 | Miki |
| 2012/0128160 | A1 | 5/2012 | Kim |
| 2012/0128166 | A1 | 5/2012 | Kim |
| 2012/0128175 | A1 | 5/2012 | Erik |
| 2012/0155688 | A1 | 6/2012 | Wilson |
| 2012/0155703 | A1 | 6/2012 | Hernandez-Abrego |
| 2012/0163625 | A1 | 6/2012 | Siotis |
| 2012/0169826 | A1 | 7/2012 | Jeong |
| 2012/0177219 | A1 | 7/2012 | Mullen |
| 2012/0182429 | A1 | 7/2012 | Forutanpour |
| 2012/0207335 | A1 | 8/2012 | Spaanderman |
| 2012/0224709 | A1 | 9/2012 | Keddem |
| 2012/0243698 | A1 | 9/2012 | Elko |
| 2012/0262536 | A1 | 10/2012 | Chen |
| 2012/0263019 | A1 | 10/2012 | Armstong-Muntner |
| 2012/0288079 | A1 | 11/2012 | Burnett |
| 2012/0288114 | A1 | 11/2012 | Duraiswami |
| 2012/0294472 | A1 | 11/2012 | Hudson |
| 2012/0327115 | A1 | 12/2012 | Chhetri |
| 2012/0328142 | A1 | 12/2012 | Horibe |
| 2013/0002797 | A1 | 1/2013 | Thapa |
| 2013/0004013 | A1 | 1/2013 | Stewart |
| 2013/0015014 | A1 | 1/2013 | Stewart |
| 2013/0016847 | A1 | 1/2013 | Steiner |
| 2013/0028451 | A1 | 1/2013 | De Roo |
| 2013/0029684 | A1 | 1/2013 | Kawaguchi |
| 2013/0034241 | A1 | 2/2013 | Pandey |
| 2013/0039504 | A1 | 2/2013 | Pandey |
| 2013/0083911 | A1 | 4/2013 | Bathurst |
| 2013/0094689 | A1 | 4/2013 | Tanaka |
| 2013/0101141 | A1 | 4/2013 | Mcelveen |
| 2013/0136274 | A1 | 5/2013 | Per |
| 2013/0142343 | A1 | 6/2013 | Matsui |
| 2013/0147835 | A1 | 6/2013 | Lee |
| 2013/0156198 | A1 | 6/2013 | Kim |
| 2013/0182190 | A1 | 7/2013 | Mccartney |
| 2013/0206501 | A1 | 8/2013 | Yu |
| 2013/0216066 | A1 | 8/2013 | Yerrace |
| 2013/0226593 | A1 | 8/2013 | Magnusson |
| 2013/0251181 | A1 | 9/2013 | Stewart |
| 2013/0264144 | A1 | 10/2013 | Hudson |
| 2013/0271559 | A1 | 10/2013 | Feng |
| 2013/0282372 | A1 | 10/2013 | Erik |
| 2013/0294616 | A1 | 11/2013 | Mulder |
| 2013/0297302 | A1 | 11/2013 | Pan |
| 2013/0304476 | A1 | 11/2013 | Kim |
| 2013/0304479 | A1 | 11/2013 | Teller |
| 2013/0329908 | A1 | 12/2013 | Lindahl |
| 2013/0332156 | A1 | 12/2013 | Tackin |
| 2013/0336516 | A1 | 12/2013 | Stewart |
| 2013/0343549 | A1 | 12/2013 | Vemireddy |
| 2014/0003635 | A1 | 1/2014 | Mohammad |
| 2014/0010383 | A1 | 1/2014 | Mackey |
| 2014/0016794 | A1 | 1/2014 | Lu |
| 2014/0029761 | A1 | 1/2014 | Maenpaa |
| 2014/0037097 | A1 | 2/2014 | Mark |
| 2014/0050332 | A1 | 2/2014 | Nielsen |
| 2014/0072151 | A1 | 3/2014 | Ochs |
| 2014/0098233 | A1 | 4/2014 | Martin |
| 2014/0098964 | A1 | 4/2014 | Rosca |
| 2014/0122060 | A1 | 5/2014 | Kaszczuk |
| 2014/0126746 | A1 | 5/2014 | Shin |
| 2014/0177857 | A1 | 6/2014 | Kuster |
| 2014/0233777 | A1 | 8/2014 | Tseng |
| 2014/0233778 | A1 | 8/2014 | Hardiman |
| 2014/0264654 | A1 | 9/2014 | Salmon |
| 2014/0265774 | A1 | 9/2014 | Stewart |
| 2014/0270271 | A1 | 9/2014 | Dehe |
| 2014/0286518 | A1 | 9/2014 | Stewart |
| 2014/0294211 | A1 | 10/2014 | Schneider |
| 2014/0295768 | A1 | 10/2014 | Wu |
| 2014/0301586 | A1 | 10/2014 | Stewart |
| 2014/0307882 | A1 | 10/2014 | Leblanc |
| 2014/0314251 | A1 | 10/2014 | Rosca |
| 2014/0341392 | A1 | 11/2014 | Lambert |
| 2014/0357177 | A1 | 12/2014 | Stewart |
| 2014/0363008 | A1 | 12/2014 | Chen |
| 2015/0003638 | A1 | 1/2015 | Kasai |
| 2015/0024799 | A1 | 1/2015 | Swanson |
| 2015/0025878 | A1 | 1/2015 | Gowreesunker |
| 2015/0030172 | A1 | 1/2015 | Gaensler |
| 2015/0033042 | A1 | 1/2015 | Iwamoto |
| 2015/0050967 | A1 | 2/2015 | Bao |
| 2015/0055796 | A1 | 2/2015 | Nugent |
| 2015/0055797 | A1 | 2/2015 | Nguyen |
| 2015/0063579 | A1 | 3/2015 | Bao |
| 2015/0070188 | A1 | 3/2015 | Aramburu |
| 2015/0078581 | A1 | 3/2015 | Etter |
| 2015/0078582 | A1 | 3/2015 | Graham |
| 2015/0097719 | A1 | 4/2015 | Balachandreswaran |
| 2015/0104023 | A1 | 4/2015 | Bilobrov |
| 2015/0117672 | A1 | 4/2015 | Christoph |
| 2015/0118960 | A1 | 4/2015 | Petit |
| 2015/0126255 | A1 | 5/2015 | Yang |
| 2015/0156578 | A1 | 6/2015 | Alexandridis |
| 2015/0163577 | A1 | 6/2015 | Benesty |
| 2015/0185825 | A1 | 7/2015 | Mullins |
| 2015/0189423 | A1 | 7/2015 | Giannuzzi |
| 2015/0195644 | A1 | 7/2015 | Wilson |
| 2015/0208171 | A1 | 7/2015 | Funakoshi |
| 2015/0237424 | A1 | 8/2015 | Wilker |
| 2015/0281832 | A1 | 10/2015 | Kishimoto |
| 2015/0281833 | A1 | 10/2015 | Shigenaga |
| 2015/0281834 | A1 | 10/2015 | Takano |
| 2015/0312662 | A1 | 10/2015 | Kishimoto |
| 2015/0312691 | A1 | 10/2015 | Jussi |
| 2015/0326968 | A1 | 11/2015 | Shigenaga |
| 2015/0341734 | A1 | 11/2015 | Sherman |
| 2015/0350621 | A1 | 12/2015 | Sawa |
| 2015/0358734 | A1 | 12/2015 | Butler |
| 2016/0011851 | A1 | 1/2016 | Zhang |
| 2016/0021478 | A1 | 1/2016 | Katagiri |
| 2016/0029120 | A1 | 1/2016 | Nesta |
| 2016/0031700 | A1 | 2/2016 | Sparks |
| 2016/0037277 | A1 | 2/2016 | Matsumoto |
| 2016/0055859 | A1 | 2/2016 | Finlow-Bates |
| 2016/0080867 | A1 | 3/2016 | Nugent |
| 2016/0088392 | A1 | 3/2016 | Huttunen |
| 2016/0100092 | A1 | 4/2016 | Bohac |
| 2016/0105473 | A1 | 4/2016 | Klingbeil |
| 2016/0111109 | A1 | 4/2016 | Tsujikawa |
| 2016/0127527 | A1 | 5/2016 | Mani |
| 2016/0134928 | A1 | 5/2016 | Ogle |
| 2016/0142548 | A1 | 5/2016 | Pandey |
| 2016/0142814 | A1 | 5/2016 | Deroo |
| 2016/0142815 | A1 | 5/2016 | Norris |
| 2016/0148057 | A1 | 5/2016 | Oh |
| 2016/0150315 | A1 | 5/2016 | Tzirkel-Hancock |
| 2016/0150316 | A1 | 5/2016 | Kubota |
| 2016/0155455 | A1 | 6/2016 | Ojanperä |
| 2016/0165340 | A1 | 6/2016 | Benattar |
| 2016/0173976 | A1 | 6/2016 | Podhradsky |
| 2016/0173978 | A1 | 6/2016 | Li |
| 2016/0189727 | A1 | 6/2016 | Wu |
| 2016/0192068 | A1 | 6/2016 | Ng |
| 2016/0196836 | A1 | 7/2016 | Yu |
| 2016/0234593 | A1 | 8/2016 | Matsumoto |
| 2016/0245698 | A1 | 8/2016 | Pau |
| 2016/0249132 | A1 | 8/2016 | Oliaei |

(56) References Cited

U.S. PATENT DOCUMENTS

| | | | | |
|---|---|---|---|---|
| 2016/0275961 | A1 | 9/2016 | Yu | |
| 2016/0295279 | A1 | 10/2016 | Srinivasan | |
| 2016/0300584 | A1 | 10/2016 | Pandey | |
| 2016/0302002 | A1 | 10/2016 | Lambert | |
| 2016/0302006 | A1 | 10/2016 | Pandey | |
| 2016/0323667 | A1 | 11/2016 | Shumard | |
| 2016/0323668 | A1 | 11/2016 | Abraham | |
| 2016/0330545 | A1 | 11/2016 | McElveen | |
| 2016/0337523 | A1 | 11/2016 | Pandey | |
| 2016/0353200 | A1 | 12/2016 | Bigeh | |
| 2016/0357508 | A1 | 12/2016 | Moore | |
| 2017/0019744 | A1 | 1/2017 | Matsumoto | |
| 2017/0064451 | A1 | 3/2017 | Park | |
| 2017/0105066 | A1 | 4/2017 | McLaughlin | |
| 2017/0134849 | A1 | 5/2017 | Pandey | |
| 2017/0134850 | A1 | 5/2017 | Graham | |
| 2017/0164101 | A1 | 6/2017 | Rollow, IV | |
| 2017/0180861 | A1 | 6/2017 | Chen | |
| 2017/0206064 | A1 | 7/2017 | Breazeal | |
| 2017/0230748 | A1 | 8/2017 | Shumard | |
| 2017/0238114 | A1 * | 8/2017 | Milne | H04W 4/80 381/79 |
| 2017/0264999 | A1 | 9/2017 | Fukuda | |
| 2017/0303887 | A1 | 10/2017 | Richmond | |
| 2017/0308352 | A1 | 10/2017 | Kessler | |
| 2017/0374454 | A1 | 12/2017 | Bernardini | |
| 2018/0083848 | A1 | 3/2018 | Siddiqi | |
| 2018/0102135 | A1 | 4/2018 | Ebenezer | |
| 2018/0102136 | A1 | 4/2018 | Ebenezer | |
| 2018/0109873 | A1 | 4/2018 | Xiang | |
| 2018/0115799 | A1 | 4/2018 | Thiele | |
| 2018/0160224 | A1 | 6/2018 | Graham | |
| 2018/0196585 | A1 | 7/2018 | Densham | |
| 2018/0219922 | A1 | 8/2018 | Bryans | |
| 2018/0227666 | A1 | 8/2018 | Barnett | |
| 2018/0292079 | A1 | 10/2018 | Branham | |
| 2018/0310096 | A1 | 10/2018 | Shumard | |
| 2018/0313558 | A1 | 11/2018 | Byers | |
| 2018/0338205 | A1 | 11/2018 | Abraham | |
| 2018/0359565 | A1 | 12/2018 | Kim | |
| 2019/0042187 | A1 | 2/2019 | Truong | |
| 2019/0124462 | A1 | 4/2019 | Lindahl | |
| 2019/0166424 | A1 | 5/2019 | Harney | |
| 2019/0182607 | A1 | 6/2019 | Pedersen | |
| 2019/0215540 | A1 | 7/2019 | Nicol | |
| 2019/0230436 | A1 | 7/2019 | Tsingos | |
| 2019/0259408 | A1 | 8/2019 | Freeman | |
| 2019/0268683 | A1 | 8/2019 | Miyahara | |
| 2019/0295540 | A1 | 9/2019 | Grima | |
| 2019/0295569 | A1 | 9/2019 | Wang | |
| 2019/0297542 | A1 | 9/2019 | Tang | |
| 2019/0319677 | A1 | 10/2019 | Hansen | |
| 2019/0371354 | A1 | 12/2019 | Lester | |
| 2019/0373362 | A1 | 12/2019 | Ansai | |
| 2019/0385629 | A1 | 12/2019 | Moravy | |
| 2019/0387311 | A1 | 12/2019 | Schultz | |
| 2019/0391783 | A1 * | 12/2019 | Moore | H04R 1/403 |
| 2020/0015021 | A1 | 1/2020 | Leppanen | |
| 2020/0021910 | A1 | 1/2020 | Rollow, IV | |
| 2020/0027472 | A1 | 1/2020 | Huang | |
| 2020/0037068 | A1 | 1/2020 | Barnett | |
| 2020/0068297 | A1 | 2/2020 | Rollow, IV | |
| 2020/0100009 | A1 | 3/2020 | Lantz | |
| 2020/0100025 | A1 | 3/2020 | Shumard | |
| 2020/0107137 | A1 | 4/2020 | Koutrouli | |
| 2020/0137485 | A1 | 4/2020 | Yamakawa | |
| 2020/0145753 | A1 | 5/2020 | Rollow, IV | |
| 2020/0152218 | A1 | 5/2020 | Kikuhara | |
| 2020/0162618 | A1 | 5/2020 | Enteshari | |
| 2020/0228663 | A1 | 7/2020 | Wells-Rutherford | |
| 2020/0251119 | A1 | 8/2020 | Yang | |
| 2020/0275204 | A1 | 8/2020 | Labosco | |
| 2020/0278043 | A1 | 9/2020 | Cao | |
| 2020/0288237 | A1 | 9/2020 | Abraham | |
| 2021/0012789 | A1 | 1/2021 | Husain | |
| 2021/0021940 | A1 | 1/2021 | Petersen | |
| 2021/0044881 | A1 | 2/2021 | Lantz | |
| 2021/0051397 | A1 | 2/2021 | Veselinovic | |
| 2021/0098014 | A1 | 4/2021 | Tanaka | |
| 2021/0098015 | A1 | 4/2021 | Pandey | |
| 2021/0120335 | A1 | 4/2021 | Veselinovic | |
| 2021/0200504 | A1 | 7/2021 | Park | |
| 2021/0375298 | A1 | 12/2021 | Zhang | |

FOREIGN PATENT DOCUMENTS

| | | | |
|---|---|---|---|
| CA | 2475283 | | 1/2005 |
| CA | 2505496 | | 10/2006 |
| CA | 2838856 | | 12/2012 |
| CA | 2846323 | | 9/2014 |
| CN | 1780495 | | 5/2006 |
| CN | 101217830 | | 7/2008 |
| CN | 101833954 | | 9/2010 |
| CN | 101860776 | | 10/2010 |
| CN | 101894558 | | 11/2010 |
| CN | 102646418 | | 8/2012 |
| CN | 102821336 | | 12/2012 |
| CN | 102833664 | | 12/2012 |
| CN | 102860039 | | 1/2013 |
| CN | 104036784 | | 9/2014 |
| CN | 104053088 | | 9/2014 |
| CN | 104080289 | A1 | 10/2014 |
| CN | 104347076 | | 2/2015 |
| CN | 104581463 | | 4/2015 |
| CN | 105355210 | | 2/2016 |
| CN | 105548998 | | 5/2016 |
| CN | 106162427 | | 11/2016 |
| CN | 106233751 | | 12/2016 |
| CN | 106251857 | | 12/2016 |
| CN | 106851036 | | 6/2017 |
| CN | 107221336 | | 9/2017 |
| CN | 107534725 | | 1/2018 |
| CN | 108172235 | | 6/2018 |
| CN | 109087664 | | 12/2018 |
| CN | 208190895 | | 12/2018 |
| CN | 109727604 | | 5/2019 |
| CN | 110010147 | | 7/2019 |
| CN | 306391029 | | 3/2021 |
| DE | 2941485 | | 4/1981 |
| EM | 0077546430001 | | 3/2020 |
| EP | 0381498 | | 8/1990 |
| EP | 0594098 | | 4/1994 |
| EP | 0869697 | | 10/1998 |
| EP | 1180914 | | 2/2002 |
| EP | 1184676 | | 3/2002 |
| EP | 0944228 | | 6/2003 |
| EP | 1439526 | | 7/2004 |
| EP | 1651001 | | 4/2006 |
| EP | 1727344 | | 11/2006 |
| EP | 1906707 | | 4/2008 |
| EP | 1952393 | | 8/2008 |
| EP | 1962547 | | 8/2008 |
| EP | 2133867 | | 12/2009 |
| EP | 2159789 | | 3/2010 |
| EP | 2197219 | | 6/2010 |
| EP | 2360940 | | 8/2011 |
| EP | 2710788 | | 3/2014 |
| EP | 2721837 | | 4/2014 |
| EP | 2772910 | | 9/2014 |
| EP | 2778310 | | 9/2014 |
| EP | 2942975 | | 11/2015 |
| EP | 2988527 | | 2/2016 |
| EP | 3035556 | | 6/2016 |
| EP | 3131311 | | 2/2017 |
| GB | 2393601 | | 3/2004 |
| GB | 2446620 | | 8/2008 |
| GB | 2512155 | | 9/2014 |
| GB | 2563857 | | 1/2019 |
| JP | S63144699 | | 6/1988 |
| JP | H01260967 | | 10/1989 |
| JP | H0241099 | | 2/1990 |
| JP | H05260589 | | 10/1993 |
| JP | H07336790 | | 12/1995 |
| JP | 2518823 | | 7/1996 |

(56) References Cited

FOREIGN PATENT DOCUMENTS

| | | |
|---|---|---|
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006067127 | 3/2006 |
| JP | 2006094389 | 4/2006 |
| JP | 2006101499 | 4/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | I484478 | 5/2015 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Eargle, "The Microphone Handbook," Elar Publ. Co., 1st ed., 1981, 4 pp.

Enright, Notes From Logan, June edition of Scanlines, Jun. 2009, 9 pp.

Fan, et al., "Localization Estimation of Sound Source by Microphones Array," Procedia Engineering 7, 2010, pp. 312-317.

Firoozabadi, et al., "Combination of Nested Microphone Array and Subband Processing for Multiple Simultaneous Speaker Localization," 6th International Symposium on Telecommunications, Nov. 2012, pp. 907-912.

Flanagan et al., Autodirective Microphone Systems, Acustica, vol. 73, 1991, pp. 58-71.

Flanagan, et al., "Computer-Steered Microphone Arrays for Sound Transduction in Large Rooms," J. Acoust. Soc. Am. 78 (5), Nov. 1985, pp. 1508-1518.

Fohhn Audio New Generation of Beam Steering Systems Available Now, audioXpress Staff, May 10, 2017, 8 pp.

Fox, et al., "A Subband Hybrid Beamforming for In-Car Speech Enhancement," 20th European Signal rocessing Conference, Aug. 2012, 5 pp.

Frost, III, An Algorithm for Linearly Constrained Adaptive Array Processing, Proc. IEEE, vol. 60, No. 8, Aug. 1972, pp. 926-935.

Gannot et al., Signal Enhancement using Beamforming and Nonstationarity with Applications to Speech, IEEE Trans. on Signal Processing, vol. 49, No. 8, Aug. 2001, pp. 1614-1626.

Gansler et al., A Double-Talk Detector Based on Coherence, IEEE Transactions on Communications, vol. 44, No. 11, Nov. 1996, pp. 1421-1427.

Gazor et al., Robust Adaptive Beamforming via Target Tracking, IEEE Transactions on Signal Processing, vol. 44, No. 6, Jun. 1996, pp. 1589-1593.

Gazor et al., Wideband Multi-Source Beamforming with Adaptive Array Location Calibration and Direction Finding, 1995 International Conference on Acoustics, Speech, and Signal Processing, May 1995, pp. 1904-1907.

Gentner Communications Corp., AP400 Audio Perfect 400 Audioconferencing System Installation & Operation Manual, Nov. 1998, 80 pgs.

Gentner Communications Corp., XAP 800 Audio Conferencing System Installation & Operation Manual, Oct. 2001, 152 pgs.

Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.

Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.

Gritton et al., Echo Cancellation Algorithms, IEEE ASSP Magazine, vol. 1, issue 2, Apr. 1984, pp. 30-38.

Hald, et al., "A class of optimal broadband phased array geometries designed for easy construction," 2002 Int'l Congress & Expo. on Noise Control Engineering, Aug. 2002, 6 pp.

Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.

Hayo, Virtual Controls for Real Life, Web page downloaded from https://hayo.io/ on Sep. 18, 2019, 19 pp.

(56) References Cited

OTHER PUBLICATIONS

Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/ Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: the Evolution of Multiparty Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016. 13 pages.
International Search Report and Written Opinion for PCT/US2016/029751 dated Nov. 28, 2016, 21 pp.
International Search Report and Written Opinion for PCT/US2018/013155 dated Jun. 8, 2018. 12 pages.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.
International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report and Written Opinion for PCT/US2022/045694 dated Mar. 17, 2023, 19 pp.
International Search Report for PCT/US2020/024005 dated Jun. 12, 2020, 12 pp.
Invensense, "Microphone Array Beamforming," Application Note AN-1140, Dec. 31, 2013, 12 pp.
Invensense, Recommendations for Mounting and Connecting InvenSense MEMS Microphones, Application Note AN-1003, 2013, 11 pp.
Invitation to Pay Additional Fees for PCT/US2022/045694 dated Jan. 24, 2023, 13 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Buck, et al., "Self-Calibrating Microphone Arrays for Speech Signal Acquisition: a Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAIaIQobChMI2JTw-Ynm6AIVgbblCh3F4QKuEAkYBiABEgJZMPD_BwE>, 3 pp, 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
ClearOne, Beamforming Microphone Array, Mar. 2012, 6 pgs.
ClearOne, Ceiling Microphone Array Installation Manual, Jan. 9, 2012, 20 pgs.
ClearOne, Converge/Converge Pro, Manual, 2008, 51 pp.

(56) References Cited

OTHER PUBLICATIONS

ClearOne, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Altemative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, as early as 2009, 2 pp.
CTG Audio, CTG User Manual for the FS-400/800 Beamforming Mixers, Nov. 2008, 26 pp.
CTG Audio, Expand Your IP Teleconferencing to Full Room Audio, Obtained from website htt. )://www ct audio com/ex and-, our-i - teleconforencino-to-ful-room-audio-while-conquennc.1-echo-cancelation-issues Mull, 2014. 3 pages.
CTG Audio, Frequently Asked Questions, as early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the CTG FS-400 and FS-800 with Beamforming Technology, as early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, a Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
DiBiase. et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing for Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AlVgbblCh3F4QKuEAkYCSABEgKybPD_BwE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. 1-121-1-124.
Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "HoloLens concept lets you control your smart home via augmented reality," digitaltrends, Jul. 26, 2016, 12 pp.
Omologo, Multi-Microphone Signal Processing for Distant-Speech Interaction, Human Activity and Vision Summer School (HAVSS), Inria Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. on Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: a Review of Studies," the Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.

(56) References Cited

OTHER PUBLICATIONS

Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 2017, 7 pgs.
Serdes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pgs. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, as early as 2020, 5 pp.
Shure, RK244G Replacement Screen and Grille, Datasheet, 2013, 1 p.
Shure, The Microflex Advance MXA310 Table Array Microphone, Available at <https://www.shure.com/en-US/products/microphones/mxa310>, as early as 2020, 12 pp.
Signal Processor MRX7-D Product Specifications, Yamaha Corporation, 2016. 12 pages.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
SM 69 Stereo Microphone, Datasheet, Georg Neumann GmbH, Available at <https://ende.neumann.com/product_files/6552/download>, 1 p.
Soda et al., Introducing Multiple Microphone Arrays for Enhancing Smart Home Voice Control, The Institute of Electronics, Information and Communication Engineers, Technical Report of IEICE, Jan. 2013, 6 pgs.
Soundweb London Application Guides, BSS Audio, 2010. 120 pgs.
Symetrix, Inc., SymNet Network Audio Solutions Brochure, 2008, 32 pgs.
Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: a Distributed MEMS Microphone Array-Based Sensor for Sound Source Localization, Sensors, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: a Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "Loud: a 1020-Node Microphone Array and Acoustic Beamformer," 14th International Congress on Sound & Vibration, Jul. 2007, 8 pgs.
Weinstein, et al., "Loud: a 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002. 78 pages.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.

(56) References Cited

OTHER PUBLICATIONS

Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: a New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: a Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Matheja, et al., "Dynamic Signal Combining for Distributed Microphone Systems in Car Environments," 2011 IEEE International Conference on Acoustics, Speech and Signal Processing, May 22, 2011, 6 pp.
McCowan, Microphone Arrays: a Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011. 3 pages.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.

(56) References Cited

OTHER PUBLICATIONS

New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017. 10 pages.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-I-284.
Olszewski, et al., "Steerable Highly Directional Audio Beam Loudspeaker," Interspeech 2005, 4 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. on Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. on Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al., "Directional Analysis of Sound Field with Linear Microphone Array and Applications in Sound Reproduction," Audio Engineering Socity, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air +grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/data-sheet-woodworks-walls.pdf>, 2019, 2 pp.
Armstrong World Industries, Inc., I-Ceilings Sound Systems Speaker Panels, 2002, 4 pgs.
Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'X2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFkAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
AVNetwork, "Top Five Conference Room Mic Myths," Feb. 25, 2015, 14 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003.
Benesty, et al., "Differential Beamforming," Fundamentals of Signal Enhancement and Array Signal Processing, First Edition, 2017, 39 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et Al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array,"

(56) References Cited

OTHER PUBLICATIONS

International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.

* cited by examiner

TRANSDUCER STEERING AND CONFIGURATION SYSTEMS AND METHODS USING A LOCAL POSITIONING SYSTEM

CROSS-REFERENCE

This application is a continuation of U.S. patent application Ser. No. 17/303,388, filed on May 27, 2021, which claims priority to U.S. Provisional Patent Application No. 63/032,171, filed on May 29, 2020, the contents of both which are incorporated herein by reference in their entireties.

TECHNICAL FIELD

This application generally relates to transducer steering and configuration systems and methods using a local positioning system. In particular, this application relates to systems and methods that utilize the position and/or orientation of transducers, devices, and/or objects within a physical environment to enable steering of lobes and nulls of the transducers, to create self-assembling arrays of the transducers, and to enable configuration of the transducers and devices through an augmented reality interface.

BACKGROUND

Conferencing environments, such as conference rooms, boardrooms, video conferencing settings, and the like, can involve the use of transducers, such as microphones for capturing sound from various audio sources active in such environments, and loudspeakers for sound reproduction in the environment. Similarly, such transducers are often utilized in live sound environments, such as for stage productions, concerts, and the like, to capture sound from various audio sources. Audio sources for capture may include humans speaking or singing, for example. The captured sound may be disseminated to a local audience in the environment through the loudspeakers (for sound reinforcement), and/or to others remote from the environment (such as via a telecast and/or a webcast).

The types of transducers and their placement in a particular environment may depend on the locations of the audio sources, listeners, physical space requirements, aesthetics, room layout, stage layout, and/or other considerations. For example, microphones may be placed on a table or lectern near the audio sources, or attached to the audio sources, e.g., a performer. Microphones may also be mounted overhead to capture the sound from a larger area, such as an entire room. Similarly, loudspeakers may be placed on a wall or ceiling in order to emit sound to listeners in an environment. Accordingly, microphones and loudspeakers are available in a variety of sizes, form factors, mounting options, and wiring options to suit the needs of particular environments.

Traditional microphones typically have fixed polar patterns and few manually selectable settings. To capture sound in an environment, many traditional microphones can be used at once to capture the audio sources within the environment. However, traditional microphones tend to capture unwanted audio as well, such as room noise, echoes, and other undesirable audio elements. The capturing of these unwanted noises is exacerbated by the use of many microphones.

Array microphones having multiple microphone elements can provide benefits such as steerable coverage or pick up patterns (having one or more lobes and/or nulls), which allow the microphones to focus on the desired audio sources and reject unwanted sounds such as room noise. The ability to steer audio pick up patterns provides the benefit of being able to be less precise in microphone placement, and in this way, array microphones are more forgiving. Moreover, array microphones provide the ability to pick up multiple audio sources with one array microphone or unit, again due to the ability to steer the pickup patterns.

Similarly, loudspeakers may include individual drivers with fixed sound lobes, and/or may be array loudspeakers having multiple drivers with steerable sound lobes and nulls. For example, the lobes of array loudspeakers may be steered towards the location of desired listeners. As another example, the nulls of array loudspeakers may be steered towards the locations of microphones in an environment so that the microphones do not sense and capture sound emitted from the loudspeakers.

However, the initial and ongoing configuration and control of the lobes and nulls of transducer systems in some physical environments can be complex and time consuming. In addition, even after the initial configuration is completed, the environment the transducer system is in may change. For example, audio sources (e.g., human speakers), transducers, and/or objects in the environment may move or have been moved since the initial configuration was completed. In this scenario, the microphones and loudspeakers of the transducer system may not optimally capture and/or reproduce sound in the environment, respectively. For example, a portable microphone held by a person may be moved towards a loudspeaker during a teleconference, which can cause undesirable capture of the sound emitted by the loudspeaker. The non-optimal capture and/or reproduction of sound in an environment may result in reduced system performance and decreased user satisfaction.

Accordingly, there is an opportunity for transducer systems and methods that address these concerns. More particular, there is an opportunity for transducer steering and configuration systems and methods that can use the position and/or orientation of transducers, devices, and/or objects within an environment to assist in steering lobes and nulls of the transducers, to create self-assembling arrays of the transducers, and to configure the transducers and devices through an augmented reality interface.

SUMMARY

The invention is intended to solve the above-noted problems by providing transducer systems and methods that are designed to, among other things: (1) utilize the position and/or orientation of transducers and other devices and objects within a physical environment (as provided by a local positioning system) to determine steering vectors for lobes and/or nulls of the transducers; (2) determine such steering vectors based additionally on the position and orientation of a target source; (3) utilize the microphones, microphone arrays, loudspeakers, and/or loudspeaker arrays in the environment to generate self-assembling arrays having steerable lobes and/or nulls; and (4) utilize the position and/or the orientation of transducers and other devices and objects to generate augmented images of the physical environment to assist with monitoring, configuration, and control of the transducer system.

In an embodiment, a system may include a plurality of transducers, a local positioning system configured to determine and provide one or more of a position or an orientation of each of the plurality of transducers within a physical environment, and a processor in communication with the plurality of transducers and the local positioning system. The processor may be configured to receive the one or more of the position or the orientation of each of the plurality of transducers from the local positioning system; determine a steering vector of one or more of a lobe or a null of at least one of the plurality of transducers, based on the one or more of the position or the orientation of each of the plurality of transducers; and transmit the steering vector to a beamformer to cause the beamformer to update the location of the one or more of the lobe or the null of the at least one of the plurality of transducers.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
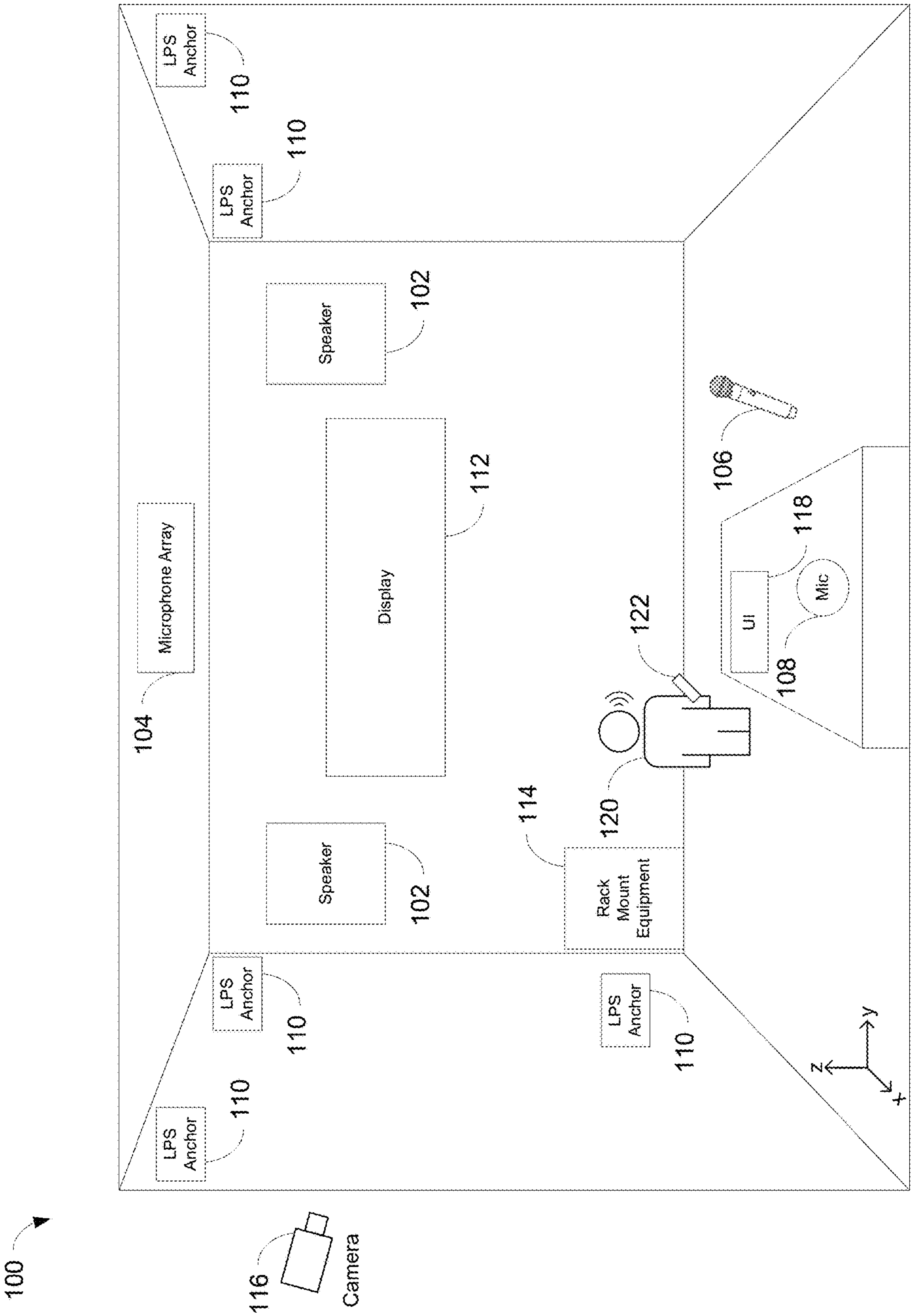
FIG. 1 is an exemplary depiction of a physical environment including a transducer system and a local positioning system, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The transducer systems and methods described herein can enable improved and optimal configuration and control of transducers, such as microphones, microphone arrays, loudspeakers, and/or loudspeaker arrays. To attain this functionality, the systems and methods can leverage positional information (i.e., the position and/or orientation) of transducers and other devices and objects within a physical environment, as detected and provided in real-time by a local positioning system. For example, when the positional information of transducers and target sources within an environment are obtained from a local positioning system, the lobes and/or nulls of the transducers can be steered to focus on the target sources and/or reject the target sources. As another example, the positional information of transducers within an environment can be utilized to create self-assembling transducer arrays that may consist of single element microphones, single element loudspeakers, microphone arrays, and/or loudspeaker arrays. As a further example, an augmented reality interface can be generated based on the positional information of transducers, devices, and/or objects within an environment in order to enable improved monitoring, configuration, and control of the transducers and devices. Through the use of the systems and methods, the transducers can be more optimally configured to attain better capture of sound and/or reproduction of sound in an environment. The more optimal capture and/or reproduction of sound in the environment may result in improved system performance and increased user satisfaction.

FIG. 1 is an exemplary depiction of a physical environment 100 in which the systems and methods disclosed herein may be used. In particular, FIG. 1 shows a perspective view of an exemplary conference room including various transducers and devices of a transducer system and a local positioning system, as well as other objects. It should be noted that while FIG. 1 illustrates one potential environment, it should be understood that the systems and methods disclosed herein may be utilized in any applicable environment, including but not limited to offices, huddle rooms, theaters, arenas, music venues, etc.

The transducer system in the environment 100 shown in FIG. 1 may include, for example, loudspeakers 102, a microphone array 104, a portable microphone 106, and a tabletop microphone 108. These transducers may be wired or wireless. The local positioning system in the environment 100 shown in FIG. 1 may include, for example, anchors 110 and tags (not shown), which may be utilized to provide positional information (i.e., position and/or orientation) of devices and/or objects within the environment 100. The tags may be physically attached to the components of the transducer system and/or to other devices in the environment 100, such as a display 112, rack mount equipment 114, a camera 116, a user interface 118, and a transducer controller 122. In embodiments, the tags of the local positioning system may also be attached to other objects in the environment, such as one or more persons 120, musical instruments, phones, tablets, computers, etc., in order to obtain the positional information of these other objects. The local positioning system may be adaptive in some embodiments so that tags (and their associated objects) may be dynamically added as and/or subtracted from being tracked as the tags enter and/or leave the environment 100. The anchors 110 may be placed appropriately throughout the environment 100 so that the positional information of the tags can be correctly determined, as is known in the art. In embodiments, the transducers in the environment 100 may communicate with components of the rack mount equipment, e.g., wireless receivers, digital signal processors, etc. It should be understood that the components shown in FIG. 1 are merely exemplary, and that any number, type, and placement of the various components in the environment 100 are contemplated and possible. The operation and connectivity of the transducer system and the local positioning system is described in more detail below.

Typically, the conference room of the environment 100 may be used for meetings where local participants communicate with each other and/or with remote participants. As such, the microphone array 104, the portable microphone 106, and/or the tabletop microphone 108 can detect and capture sounds from audio sources within the environment 100. The audio sources may be one or more human speakers 120, for example. In a common situation, human speakers may be seated in chairs at a table, although other configurations and placements of the audio sources are contemplated and possible. Other sounds may be present in the environment 100 which may be undesirable, such as noise from ventilation, other persons, electronic devices, shuffling papers, etc. Other undesirable sounds in the environment 100 may include noise from the rack mount equipment 114, and sound from the remote meeting participants (i.e., the far end) that is reproduced on the loudspeakers 102. When the locations of such undesirable sounds are known (e.g., a vent in the environment 100 is static and fixed), tags can be attached to the sources of the undesirable sounds, and/or the positional information of the sources of the undesirable sounds can be directly entered into the local positioning system.

The microphone array 104 and/or the microphone 108 may be placed on a ceiling, wall, table, lectern, desktop, etc. so that the sound from the audio sources can be detected and captured, such as speech spoken by human speakers. The portable microphone 106 may be held by a person, or mounted on a stand, for example. The microphone array 104, the portable microphone 106, and/or the microphone 108 may include any number of microphone elements, and be able to form multiple pickup patterns so that the sound from the audio sources can be detected and captured. Any appropriate number of microphone elements are possible and contemplated in the microphone array 104, portable microphone 106, and microphone 108. In embodiments, the portable microphone 106 and/or the microphone 108 may consist of a single element.

Each of the microphone elements in the array microphone 104, the portable microphone 106, and/or the microphone 108 may detect sound and convert the sound to an analog audio signal. Components in the array microphone 104, the portable microphone 106, and/or the microphone 108, such as analog to digital converters, processors, and/or other components, may process the analog audio signals and ultimately generate one or more digital audio output signals. The digital audio output signals may conform to the Dante standard for transmitting audio over Ethernet, in some embodiments, or may conform to another standard and/or transmission protocol. In embodiments, each of the microphone elements in the array microphone 104, the portable microphone 106, and/or the microphone 108 may detect sound and convert the sound to a digital audio signal.

One or more pickup patterns may be formed by the array microphone 104, the portable microphone 106, and/or the microphone 108 from the audio signals of the microphone elements, and a digital audio output signal may be generated corresponding to each of the pickup patterns. The pickup patterns may be composed of one or more lobes, e.g., main, side, and back lobes, and/or one or more nulls. In other embodiments, the microphone elements in the array microphone 104, the portable microphone 106, and/or the microphone 108 may output analog audio signals so that other components and devices (e.g., processors, mixers, recorders, amplifiers, etc.) external to the array microphone 104, the portable microphone 106, and/or the microphone 108 may process the analog audio signals. In embodiments, higher order lobes can be synthesized from the aggregate of some or all available microphones in the system in order to increase overall signal to noise. In other embodiments, the selection of particular microphones in the system can gate (i.e., shut off) the sound from unwanted audio sources to increase signal to noise.

The pickup patterns that can be formed by the array microphone 104, the portable microphone 106, and/or the microphone 108 may be dependent on the type of beamformer used with the microphone elements. For example, a delay and sum beamformer may form a frequency-dependent pickup pattern based on its filter structure and the layout geometry of the microphone elements. As another example, a differential beamformer may form a cardioid, subcardioid, supercardioid, hypercardioid, or bidirectional pickup pattern. The microphone elements may each be a MEMS (micro-electrical mechanical system) microphone with an omnidirectional pickup pattern, in some embodiments. In other embodiments, the microphone elements may have other pickup patterns and/or may be electret condenser microphones, dynamic microphones, ribbon microphones, piezoelectric microphones, and/or other types of microphones. In embodiments, the microphone elements may be arrayed in one dimension or multiple dimensions.

In embodiments, sound in an environment can be sensed by aggregating the audio signals from microphone elements in the system, including microphone elements that are clustered (e.g., in the array microphone 104) and/or single microphone elements (e.g., in the portable microphone 106 or the microphone 108), in order to create a self-assembling microphone array. The signal to noise ratio of a desired audio source can be improved by leveraging the positional information of the microphones in the system to weight and sum individual microphone elements and/or clusters of microphone elements using a beamformer (such as beamformer 204 in FIG. 2 described below), and/or by gating (i.e., muting) microphone elements and/or clusters of microphone elements that are only contributing undesired sound (e.g., noise).

Each weighting of the microphone elements and/or clusters of microphone elements may have a complex weight (or coefficient) $c_x$ that is determined based on the positional information of the microphone elements and clusters. For example, if the microphone array 104 has a weight $c_1$, the portable microphone 106 has a weight $c_2$, and the microphone 108 has a weight $c_3$, then an audio output signal from the system using these microphones may be generated based on weighting the audio signals $P_x$ from the microphones (e.g., the audio output signal may be based on $c_1P_{104}+c_2P_{106}+c_3P_{108}$). The weight $c_x$ for a particular microphone may be determined based on the difference in distance between each microphone ($r_x$) and a reference distance $r_0$ (which may be the distance between the audio source and the furthest microphone). Accordingly, the weight $c_x$ for a particular microphone may be determined by the following equation $c_x = e^{-jk\varepsilon_x}$, w here $\varepsilon_x = |\widehat{r_x}| - |\widehat{r_0}|$, which results in delaying the signals from the microphone that are closer than the reference distance $r_0$. In embodiments, the contributions from each microphone element or clusters of microphone elements may be nested in order to optimize directionality over audio bandwidth (e.g., using a larger separation between microphone elements for lower frequency signals).

The loudspeakers 102 may be placed on a ceiling, wall, table, etc. so that sound may be reproduced to listeners in the environment 100, such as sound from the far end of a conference, pre-recorded audio, streaming audio, etc. The loudspeakers 102 may include one or more drivers configured to convert an audio signal into a corresponding sound. The drivers may be electroacoustic, dynamic, piezoelectric, planar magnetic, electrostatic, MEMS, compression, etc. The audio signal can be a digital audio signal, such signals that conform to the Dante standard for transmitting audio over Ethernet or another standard. In embodiments, the audio signal may be an analog audio signal, and the loudspeakers 102 may be coupled to components, such as analog to digital converters, processors, and/or other components, to process the analog audio signals and ultimately generate one or more digital audio signals.

In embodiments, the loudspeakers 102 may be loudspeaker arrays that consist of multiple drivers. The drivers may be arrayed in one dimension or multiple dimensions. Such loudspeaker arrays can generate steerable lobes of sound that can be directed towards particular locations, as well as steerable nulls where sound is not directed towards other particular locations. In embodiments, loudspeaker arrays may be configured to simultaneously produce multiple lobes each with different sounds that are directed to different locations. The loudspeaker array may be in communication with a beamformer. In particular, the beamformer may receive and process an audio signal and generate corresponding audio signals for each driver of the loudspeaker array.

In embodiments, acoustic fields generated by the loudspeakers in the system can be generated by aggregating the loudspeakers in the system, including loudspeakers that are clustered or single element loudspeakers, in order to create a self-assembling loudspeaker array. The synthesis of acoustic fields at a desired position in the environment 100 can be improved by leveraging the positional information of the loudspeakers in the system, similar to the self-assembling microphones described above. For example, individual loudspeaker elements and/or clusters of loudspeaker elements may be weighted and summed by a beamformer (e.g., beamformer 204) to create the desired synthesized acoustic field.

Figure 2:
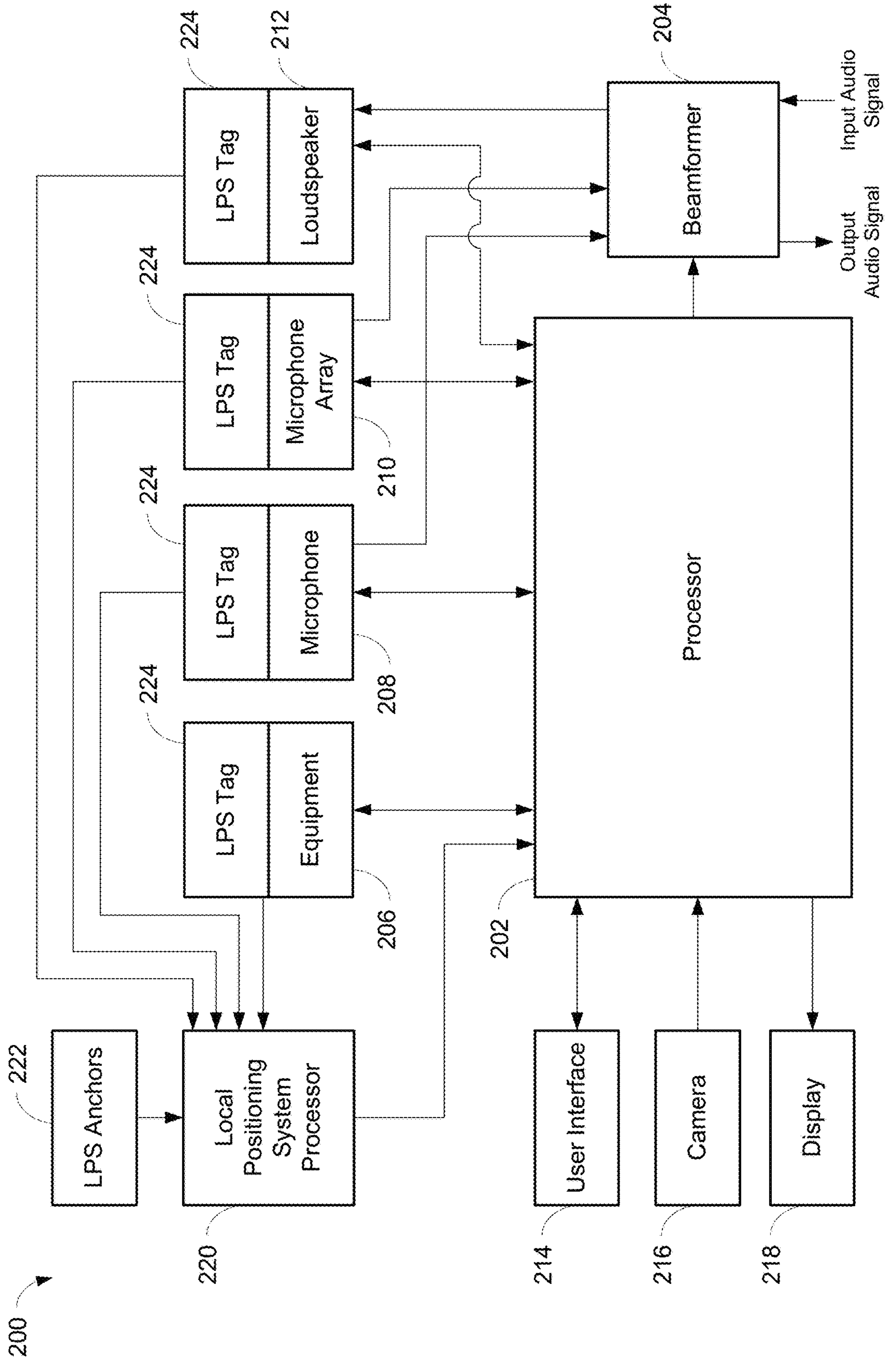
FIG. 2 is a block diagram of a system including a transducer system and a local positioning system, in accordance with some embodiments.

Turning to FIG. 2, a block diagram including a system 200 is depicted that includes a transducer system and a local positioning system. The system 200 may enable improved and optimal configuration and control of the transducer system by utilizing positional information (i.e., the position and/or the orientation) of the transducers, devices, and/or objects within a physical environment, as detected and provided in real-time by the local positioning system. In an embodiment, the system 200 may be utilized within the environment 100 of FIG. 1 described above. The components of the system 200 may be in wired and/or wireless communication with the other components of the system 200, as depicted in FIG. 2 and described in more detail below.

The transducer system of the system 200 in FIG. 2 may include a processor 202, a beamformer 204, equipment 206 (e.g., the rack mounted equipment 114 and transducer controller 122 of FIG. 1), a microphone 208 (e.g., the portable microphone 106 or tabletop microphone 108 of FIG. 1), a microphone array 210 (e.g., the microphone array 104 of FIG. 1), and a loudspeaker 212 (e.g., the loudspeakers 102 of FIG. 1). The microphone 208 and the microphone array 210 may detect and capture sounds from audio sources within an environment. The microphone 208 and the microphone array 210 may form various pickup patterns that each have one or more steerable lobes and/or nulls. The beamformer 204 may utilize the audio signals from the microphone 208 and the microphone array 210 to form different pickup patterns, resulting in a beamformed signal. The loudspeaker 212 may convert an audio signal to reproduce sound, and may also have one or more steerable lobes and/or nulls. The beamformer 204 may receive an input audio signal and convert the input audio signal into the appropriate audio signals for each driver of the loudspeaker 212.

The local positioning system of the system 200 may include a local positioning system processor 220, one or more anchors 222, and one or more tags 224. The local positioning system may determine and provide positional information (i.e., position and/or orientation) of devices in the system 200 and other objects in an environment, e.g., persons, that have tags attached. In particular, the local positioning system processor 220 may utilize information from the anchors 222 and the tags 224 to determine the positional information of the devices and/or objects within an environment. The anchors 222 may be fixed in known positions within the environment in order to define a local coordinate system, e.g., as shown by the anchors 110 in FIG. 1. In embodiments, the anchors 222 may be attached to objects that are non-permanently fixed within an environment, in order to create a local positioning reference origin. For example, in a live music venue, anchors 222 may be attached to objects that are fixed for a particular performance, such as microphone stands. When anchors 222 are attached to multiple objects in this fashion, a nested positioning system or a master/slave-type system may result where the anchors 222 may provide improve performance by over-constraining the system.

The tags 224 may be physically attached to devices of the system 200 and/or to objects in the environment, and be in communication with the anchors 222, such that the positional information of the devices and/or objects in the environment can be determined based on the distances between the tags 224 and the anchors 222 (e.g., via trilateration, as is known in the art). In embodiments, some or all of the devices and/or objects in the system 200 and in the environment may have integrated tags 224 and/or anchors 222, and/or include components that perform the same functions as the tags 224 and/or anchors 222. For example, the devices in the system 200 may have integrated tags 224 and anchors 222 (e.g., microphones, speakers, displays, etc.), while other objects in the environment have tags 224 attached to them (e.g., asset tags, badges, etc.). In embodiments, a user may establish the locations of devices serving as the anchors 222 within an environment, such as by graphically placing such devices in setup software (e.g., Shure Designer system configuration software).

The local positioning system processor 200 may determine and provide the positional information of the devices and/or objects within the environment to the processor 202. The local positioning system processor 200 may also detect when tags 224 enter and/or leave the environment where the system 200 is by using, for example, a proximity threshold that determines when a tag 224 is within a certain distance of the environment. For example, as tags 224 enter the environment that the system 200 is in, the positional information of such tags 224 can be determined.

For example, a tag 224 may be attached to a device or object in the environment and may transmit ultra-wideband radio frequency (UWB RF) pulses that are received by the anchors 222. The tag 224 and the anchors 222 may be synchronized to a master clock. Accordingly, the distance between a tag 224 and an anchor 222 may be computed based on the time of flight of the emitted pulses. For determining the position of a tag 224 (attached to a device or object) in three dimensional space, at least four fixed anchors 222 are needed, each having a known position within the environment. In other embodiments, technologies such as radio frequency identification (RFID), infrared, Wi-Fi, etc. can be utilized to determine the distance between the tags 224 and anchors 222, in order to determine the positional information of devices and/or objects within an environment. In embodiments, the local positioning system processor 220 may determine and provide the position of a device or object within an environment in Cartesian coordinates (i.e., x, y, z), or in spherical coordinates (i.e., radial distance r, polar angle θ (theta), azimuthal angle φ (phi)), as is known in the art.

In embodiments, the position of a tag 224 (attached to a device or object) may be determined in two dimensional space through the use of three fixed anchors 222 (each having a known a position within the environment). The local positioning system processor 220 may determine and provide the position of a device or object in these embodiments in Cartesian coordinates (i.e., x, y), or in spherical coordinates (i.e., radial distance r, polar angle θ (theta)). For example, the x-y position of a speaker with a tag 224 attached may be determined by the local positioning system processor 220, and the system 200 may determine the three-dimensional position of such a speaker by combining the determined x-y position with an assumption that such a speaker is typically at a particular height.

In embodiments, positional information may be obtained from devices in the environment that are not native to the system 200 but that have compatible technologies. For example, a smartphone or tablet may have hardware and software that enables UWB RF transmission. In this case, the system 200 may utilize positional information from such non-native devices in a similar fashion as the positional information obtained from tags 224 in the system 200.

The orientation of the devices and objects within the environment may also be determined and provided by the local positioning system processor 220. The orientation of a particular device or object may be defined by the rotation of a tag 224 attached to a device or object, relative to the local coordinate system. In embodiments, the tag 224 may include an inertial measurement unit that includes a magnetometer, a gyroscope, and an accelerometer that can be utilized to determine the orientation of the tag 224, and therefore the orientation of the device or object the tag 224 is attached to. The orientation may be expressed in Euler angles or quaternions, as is known in the art.

Other devices in the system 200 may include a user interface 214 (e.g., user interface 118 of FIG. 1), a camera 216 (e.g., camera 116 of FIG. 1), and a display 218 (e.g., display 112 of FIG. 1). As described in more detail below, the user interface 214 may allow a user to interact with and configure the system 200, such as by viewing and/or setting parameters and/or characteristics of the devices of the system 200. For example, the user interface 214 may be used to view and/or adjust parameters and/or characteristics of the equipment 206, microphone 208, microphone array 210, and/or loudspeaker 212, such as directionality, steering, gain, noise suppression, pattern forming, muting, frequency response, RF status, battery status, etc. The user interface 214 may facilitate interaction with users, be in communication with the processor 202, and may be a dedicated electronic device (e.g., touchscreen, keypad, etc.) or a standalone electronic device (e.g., smartphone, tablet, computer, virtual reality goggles, etc.). The user interface 214 may include a screen and/or be touch-sensitive, in embodiments.

The camera 216 may capture still images and/or video of the environment where the system 200 is located, and may be in communication with the processor 202. In some embodiments, the camera 216 may be a standalone camera, and in other embodiments, the camera 216 may be a component of an electronic device, e.g., smartphone, tablet, etc. The images and/or video captured by the camera 216 may be utilized for augmented reality configuration of the system 200, as described in more detail below. The display 218 may be a television or computer monitor, for example, and may show other images and/or video, such as the remote participants of a conference or other image or video content. In embodiments, the display 218 may include microphones and/or loudspeakers.

It should be understood that the components shown in FIG. 2 are merely exemplary, and that any number, type, and placement of the various components of the system 200 are contemplated and possible. For example, there may be multiple portable microphones 208, a loudspeaker 212 with a single driver, a loudspeaker array 212, etc. Various components of the system 200 may be implemented using software executable by one or more computers, such as a computing device with a processor and memory, and/or by hardware (e.g., discrete logic circuits, application specific integrated circuits (ASIC), programmable gate arrays (PGA), field programmable gate arrays (FPGA), digital signal processors (DSP), microprocessor, etc.). For example, some or all components of the system 200 may be implemented using discrete circuitry devices and/or using one or more processors (e.g., audio processor and/or digital signal processor) executing program code stored in a memory (not shown), the program code being configured to carry out one or more processes or operations described herein, such as, for example, the methods shown in FIGS. 3 and 6. Thus, in embodiments, the system 200 may include one or more processors, memory devices, computing devices, and/or other hardware components not shown in FIG. 2. In one embodiment, the system 200 includes separate processors for performing various functionality, and in other embodiments, the system 200 may perform all functionality using a single processor.

In embodiments, position-related patterns that vary as a function of time may be detected and stored by the system 200. For example, a processor may execute a learning algorithm and/or perform statistical analysis on collected positional information to detect such patterns. The patterns may be utilized to adaptively optimize future usage of the system 200. For example, the intermittent cycling of an HVAC system, positional information of vents in an environment, and/or temperatures in the environment can be tracked over time, and compensated for during sound reinforcement. As another example, the positional information for a portable microphone may be tracked and mapped with instances of feedback in order to create an adaptive, positional mapping of equalization for the microphone to eliminate future feedback events.

Figure 3:
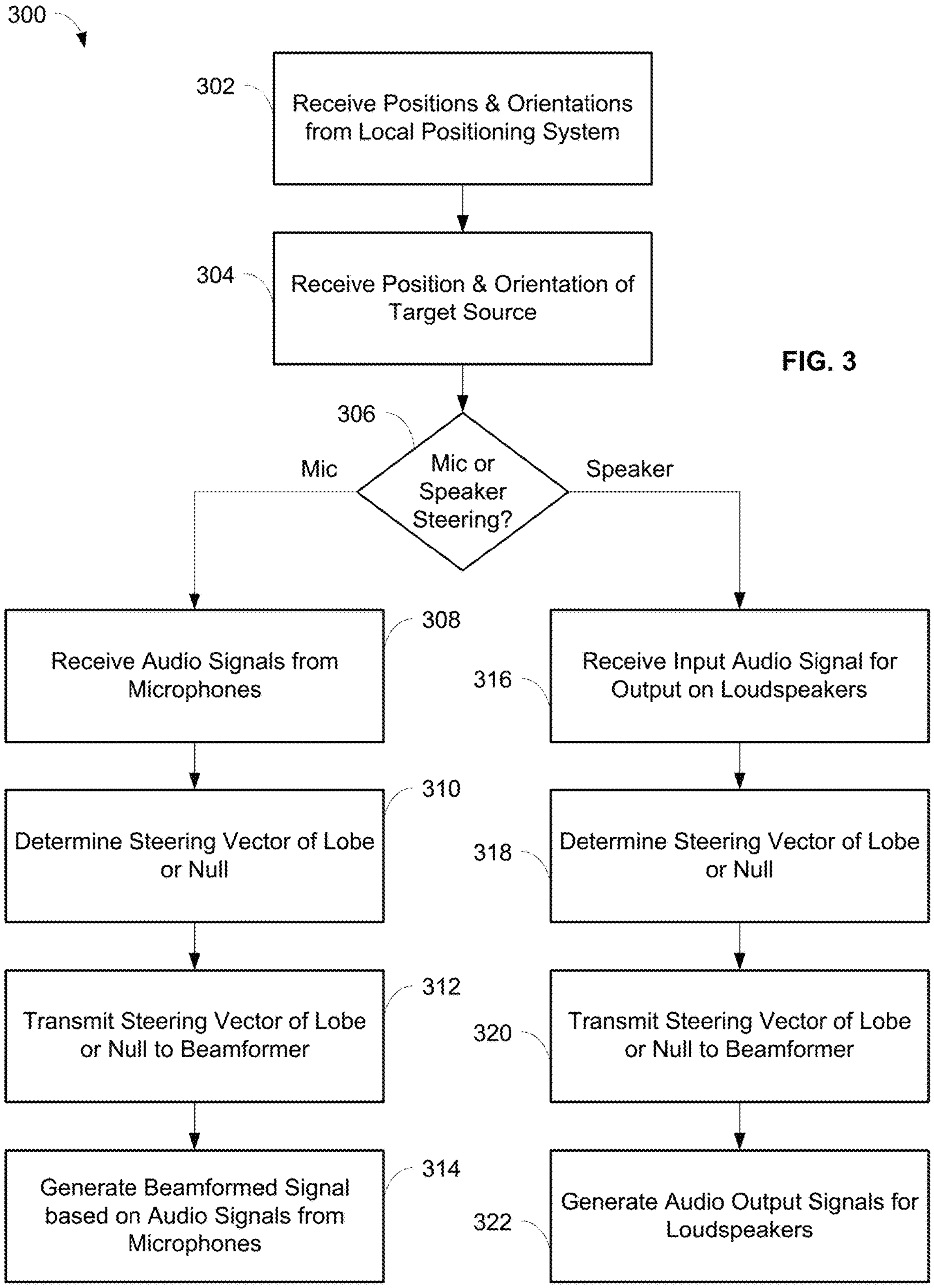
FIG. 3 is a flowchart illustrating operations for steering of lobes and/or nulls of a transducer system with the system of FIG. 2, in accordance with some embodiments.

An embodiment of a process 300 for steering lobes and/or nulls of the transducers in the transducer system of the system 200 is shown in FIG. 3. The process 300 may be utilized to steer the lobes and/or nulls of microphones and loudspeakers in the transducer system, based on positional information (i.e., the position and/or the orientation) of the microphones, loudspeakers, and other devices and objects within a physical environment. The positional information may be detected and provided in real-time by a local positioning system. The result of the process 300 may be the generation of a beamformed output signal that corresponds to a pickup pattern of a microphone or microphone array, where the pickup pattern has steered lobes and/or nulls that take into account the positional information of transducers and other devices and objects in the environment. The process 300 may also result in the generation of audio output signals for drivers of a loudspeaker or loudspeaker array, where the loudspeaker or loudspeaker array has steered lobes and/or nulls that take into account the positional information of transducers and other devices and objects in the environment.

The system 200 and the process 300 may be utilized with various configurations and combinations of transducers in a particular environment. For example, the lobes and nulls of a microphone, microphone array, loudspeaker, and/or loudspeaker array may be steered based on their positional information and also the positional information of other devices, objects, and target sources within an environment. As another example, a self-assembling microphone array with steerable lobes and nulls may be created from the audio signals of single element microphones and/or microphone arrays, based on their positional information within an environment. As a further example, a self-assembling loudspeaker array with steerable lobes and nulls may be created from individual loudspeakers and/or loudspeaker arrays, based on their positional information within an environment.

At step 302, the positions and orientations of the transducers, devices, and objects within an environment may be received at the processor 202 from the local positioning system processor 220. The transducers, devices, and objects being tracked within the environment may each be attached to a tag 224 of the local positioning system, as described previously. The transducers, devices, and objects may include microphones (with single or multiple elements), microphone arrays, loudspeakers, loudspeaker arrays, equipment, persons, etc. in the environment.

In embodiments, the position and/or orientation of some of the transducers, devices, and objects within the environment may be manually set and/or be determined without use of the local positioning system processor 220 (i.e., without having tags 224 attached). In these embodiments, transducers that do not utilize the local positioning system (such as a microphone or loudspeaker) may still be steered, as described in more detail below. In particular, the pointing of a lobe or null towards or away from the location of a particular target source can be based on the positional information of target sources from the local positioning system processor 220 and the positional information of the non-local positioning system transducers.

In embodiments, a transducer controller 122 (attached to a tag 224) may be pointed by a user to cause steering of a microphone (e.g., microphone array 104) or loudspeaker (e.g., loudspeakers 102) in the system 200. In particular, the position and orientation of the transducer controller 122 may be received at step 302 and utilized later in the process 300 for steering of a microphone or loudspeaker. For example, a user pointing the transducer controller 122 at themselves can cause a microphone to be steered to sense sound from the user. As another example, a user pointing the transducer controller 122 at an audience can cause a loudspeaker to generate sound towards the audience. In embodiments, the transducer controller 122 may appear to be a typical wireless microphone or similar audio device. In embodiments, gesturing of the transducer controller 122 may be interpreted for controlling aspects of the system 200, such as volume control.

At step 304, the positional information (i.e., position and/or orientation) of a target source within the environment may be received at the processor 202. A target source may include an audio source to be focused on (e.g., a human speaker), or an audio source to be rejected or avoided (e.g., a loudspeaker, unwanted noise, etc.). In embodiments, a position of the target source is sufficient for the process 300, and in some embodiments, orientation of the target source may be utilized to optimize the process 300. For example, knowing the orientation of a target source (i.e., which way it is pointing) that is between two microphones can be helpful in determining which microphone to utilize for sensing sound from that target source.

In embodiments, the position and/or orientation of the target source may be received from the local positioning system processor 220, such as when a tag 224 is attached to the target source. In other embodiments, the position and orientation of the target source may be manually set at step 304. For example, the location of a permanently installed ventilation system may be manually set since it is static and does not move within the environment.

It may be determined at step 306 whether a microphone or a loudspeaker is being steered. If a microphone is being steered, then the process 300 may continue to step 308. At step 308, audio signals from one, some, or all of the microphones in the environment may be received at the beamformer 204. As described previously, each microphone may sense and capture sound and convert the sound into an audio signal. The audio signals from each microphone may be utilized later in the process 300 to generate a beamformed signal that corresponds to a pickup pattern having steered lobes and/or nulls. Due to the local positioning system of the system 200 knowing the positional information of each microphone element, directionality can be synthesized from some or all of the microphone elements in the system 200 (i.e., self-assembling microphone arrays), as described previously.

At step 310, the processor 202 may determine the steering vector of a lobe or null of the microphone, based on the positional information of the transducers, devices, and/or objects in the environment, as received at step 302. The steering vector of the lobe or null of the microphone may also be based on the positional information of the target source, as received at step 304. The steering vector may cause the pointing of a lobe or null of the microphone towards or away from the location of a particular target source. For example, it may be desired to point a lobe of the microphone towards a target source that is a human speaker participating in a conference so that the voice of the human speaker is detected and captured. Similarly, it may be desired to point a null of the microphone away from a target source to ensure that the sound of the target source is not purposely rejected. As another example, it may be desired to point a null of the microphone towards a target source that is unwanted noise, such as a fan or a loudspeaker, so that the unwanted noise from that target source is not detected and captured. The detection and capture of unwanted noise may also be avoided by pointing a lobe of the microphone away from such a target source. In an embodiment using the transducer controller 122 described previously, the processor 202 may determine a steering vector for a microphone based on the positional information of the transducer controller 122.

In the scenario of pointing a lobe or null of a microphone towards or away from a target source, the steering vector may be determined at step 310 by taking into account the positional information of the microphone in the environment as well as the positional information of the target source in the environment. In other words, the steering vector of the lobe or null can point to a particular three dimensional coordinate in the environment relative to the location of the microphone, which can be towards or away from the location of the target source. In embodiments, the position vectors of the microphone and the target source can be subtracted to obtain the steering vector of the lobe or null.

The steering vector determined at step 310 may be transmitted at step 312 from the processor 202 to the beamformer 204. At step 314, the beamformer 204 may form the lobes and nulls of a pickup pattern of the microphone by combining the audio signals received at step 308, and then generating a beamformed signal corresponding to the pickup pattern. The lobes and nulls may be formed using any suitable beamforming algorithm. The lobes may be formed to correspond to the steering vector determined at step 310, for example.

Returning to step 306, if a loudspeaker is being steered, then the process 300 may continue to step 316. At step 316, an input audio signal may be received at the beamformer 204 that is to be reproduced on the loudspeaker. The input audio signal may be received from any suitable audio source, and may be utilized later in the process 300 to generate audio output signals for the loudspeaker such that the loudspeaker has steered lobes and/or nulls. Due to the local positioning system of the system 200 knowing the positional information of each loudspeaker element, directionality can be synthesized from some or all of the loudspeaker elements in the system 200 (i.e., self-assembling loudspeaker arrays), as described previously.

At step 318, the processor 202 may determine the steering vector of the lobe or null of the loudspeaker, based on the positional information of the devices and/or objects in the environment, as received at step 302. The steering vector of the lobe or null of the loudspeaker may also be based on the positional information of the target source, as received at step 304. The steering vector may cause the pointing of the lobe or null of the loudspeaker towards or away from the location of a particular target source. For example, it may be desired to point a lobe of the loudspeaker towards a target source that is a listener in an audience so that the listener can hear the sound emitted from the loudspeaker. Similarly, it may be desired to point a null of the loudspeaker away from a target source to ensure that a particular location is not purposely avoided so that the location may still be able to hear the sound emitted from the loudspeaker. As another example, it may be desired to point a null of the loudspeaker towards a target source so that a particular location does not hear the sound emitted from the loudspeaker. A particular location may also be avoided from hearing the sound emitted from the loudspeaker by pointing a lobe of the loudspeaker away from such a target source.

In the scenario of pointing a lobe or null of a loudspeaker towards or away from a target source, the steering vector may be determined at step 318 by taking into account the positional information of the loudspeaker in the environment as well as the positional information of the target source in the environment. In other words, the steering vector of the lobe or null can be a particular three dimensional coordinate in the environment relative to the location of the loudspeaker, which can be towards or away from the location of the target source.

The steering vector determined at step 318 may be transmitted at step 320 from the processor 202 to the beamformer 204. At step 322, the beamformer 204 may form the lobes and nulls of the loudspeaker by generating a separate audio output signal for each loudspeaker (or driver in a loudspeaker array) based on the input audio signal received at step 316. The lobes and nulls may be formed using any suitable beamforming algorithm. The lobes may be formed to correspond to the steering vector determined at step 318, for example.

Figure 4:
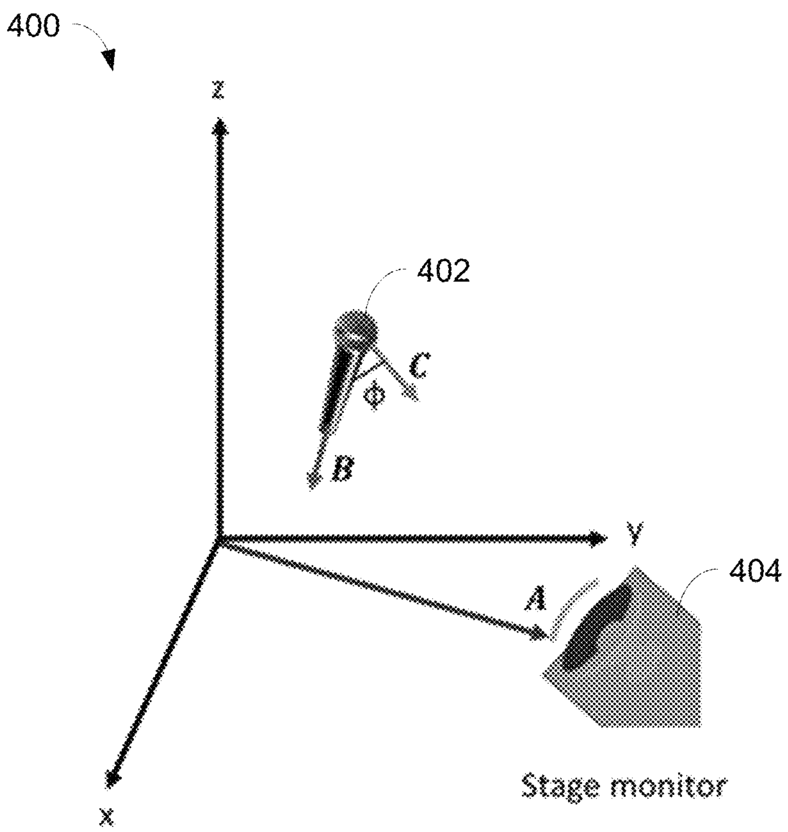
FIG. 4 is an schematic diagram of an exemplary environment including a microphone and a loudspeaker, in accordance with some embodiments.
Figure 5:
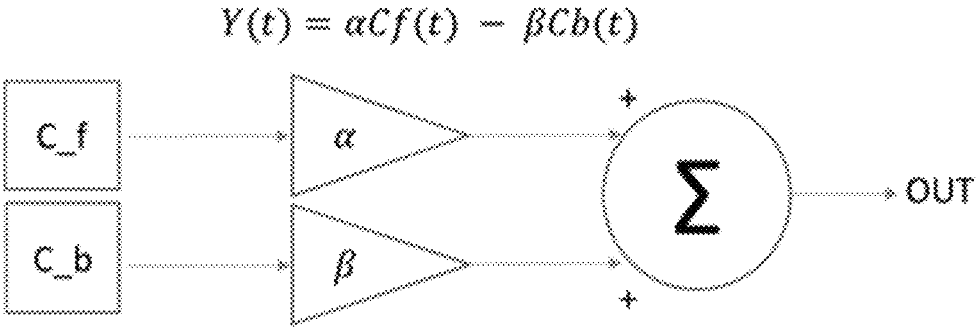
FIG. 5 is an exemplary block diagram showing null steering of the microphone with respect to the loudspeaker in the environment shown in FIG. 4, in accordance with some embodiments.

An example of null steering of a microphone will now be described with respect to the schematic diagram of an exemplary environment as shown in FIG. 4 and the block diagram of FIG. 5. In FIG. 4, a portable microphone 402 and a loudspeaker 404 (e.g., a stage monitor) are depicted in an environment 400. It may be desirable that the microphone 402 does not detect and capture sound from the loudspeaker 404, in order to reduce feedback. The system 200 and the process 300 may be utilized to steer a null of the microphone 402 towards the loudspeaker 404 such that the microphone 402 does not detect and capture the sound emitted from the loudspeaker 404.

The microphone 402 may include multiple elements so that lobes and nulls can be formed by the microphone 402. For example, the microphone 402 may include two microphone elements Cf and Cb, each with a cardioid pickup pattern, that face in opposite directions. As seen in FIG. the output from the microphone elements Cf and Cb may be scaled by coefficients $\alpha$ and $\beta$, respectively. The coefficients may be calculated based on the positional information (i.e., position and orientation) of the microphone 402 and the positional information of the unwanted target source, i.e., the loudspeaker 404.

The positional information of the microphone 402 and the loudspeaker 404 can be defined with respect to the same origin of a local coordinate system. As seen in FIG. 4, the local coordinate system may be defined by three orthogonal axes. A unit vector A of the loudspeaker 404 and a unit vector B of the microphone 402 may be defined for use in calculating a steering angle $\theta_{null}$ and a steering vector C for the null of the microphone 402. In particular, the steering angle $\theta_{null}$ of the null of the microphone 402 (i.e., towards the loudspeaker 404) can be calculated through the dot product of the unit vectors A and B, which is subtracted from 180 degrees, based on the following set of equations. In the following equations, the outputs of the elements are defined as Cf(t) and Cb(t) and the output of the microphone 402 is defined as Y(t).

The unit vector A (from the origin to the loudspeaker 404) may be calculated based on the positional information of the loudspeaker 404 using the equation:

$$\hat{a} = \frac{A_x}{\sqrt{A_x^2 + A_y^2 + A_z^2}}, \frac{A_y}{\sqrt{A_x^2 + A_y^2 + A_z^2}}, \frac{A_z}{\sqrt{A_x^2 + A_y^2 + A_z^2}}$$

The unit vector B (from the origin to the microphone 402) may be calculated based on the positional information of the microphone 402 using the equation:

$$\hat{b}=b_x\hat{x},b_y\hat{y},b_z\hat{z} \text{ (from rotation matrix)}$$

The dot product of the unit vectors A and B may be calculated using the equation:

$$\varphi=\cos^{-1}(\hat{a}\cdot\hat{b})$$

Finally, the steering angle $\theta_{null}$ of the microphone 402 can be calculated as:

$$\theta_{null}=\pi-\varphi$$

Depending on the magnitude of the steering angle $\theta_{null}$, the coefficients $\alpha$ and $\beta$ for scaling the output of the microphone elements Cf and Cb, respectively, may be determined based on the following equations:

$$\theta \geq 90°,\ Y(t) = \alpha Cf(t) - \beta Cb(t),\ \alpha = 1,\ \beta = \frac{1+\cos(\theta_{null})}{1-\cos(\theta_{null})}. \quad 1$$

$$\theta < 90°\ Y(t) = \alpha Cf(t) - \beta Cb(t),\ \alpha = -\left[\frac{1+\cos(\pi-\theta_{null})}{1-\cos(\pi-\theta_{null})}\right],\ \beta = -1. \quad 2$$

The output Y(t) of the microphone 402 may therefore include a pickup pattern having a null from the microphone 402 towards the loudspeaker 404. As the positional information of the microphone 402 and/or the loudspeaker 404 changes, the null of the microphone 402 can be dynamically steered sot that it always points towards the loudspeaker 404.

Figure 6:
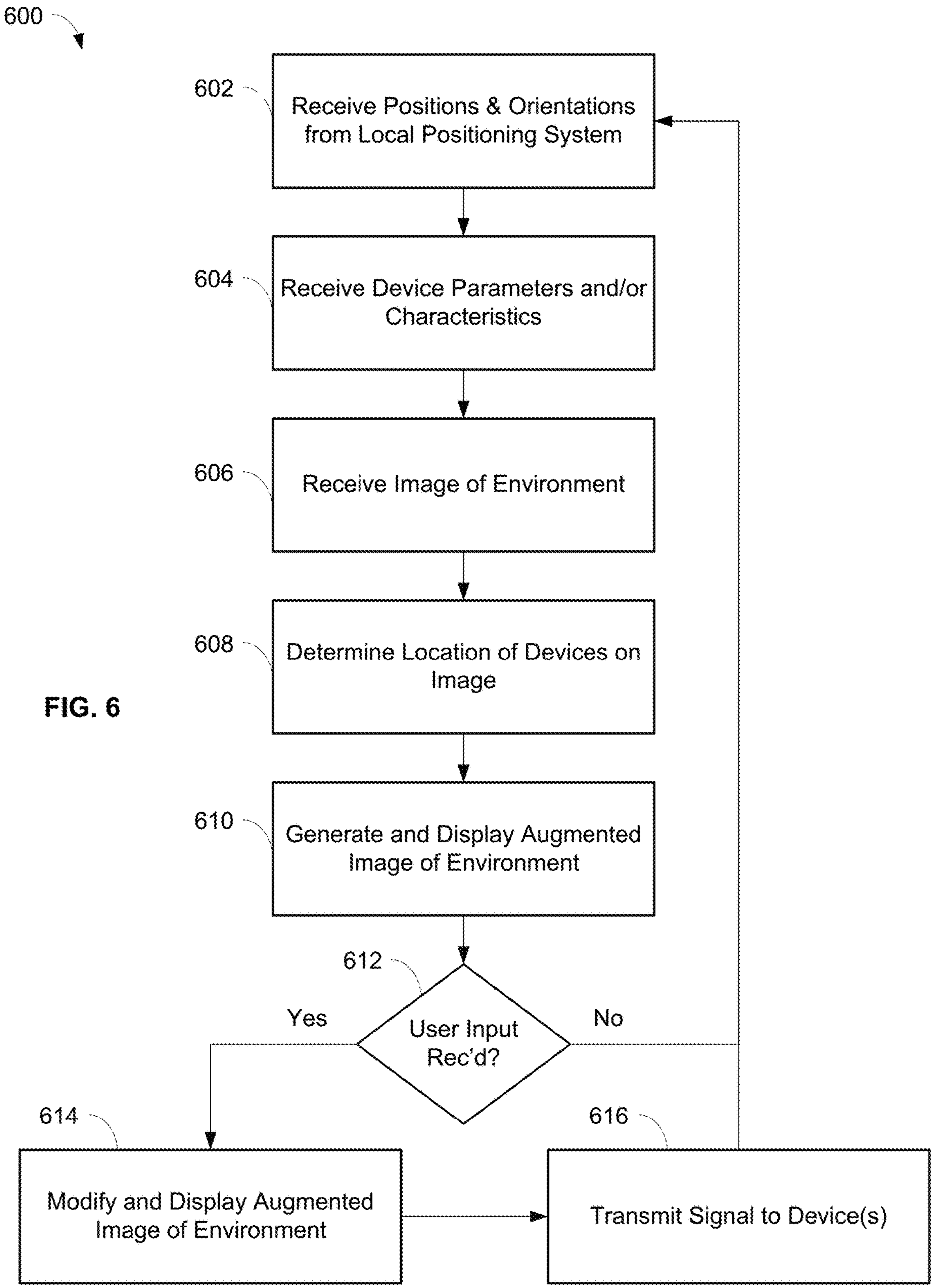
FIG. 6 is a flowchart illustrating operations for configuration and control of a transducer system using an augmented reality interface with the system of FIG. 2, in accordance with some embodiments.

An embodiment of a process 600 for configuration and control of the system 200 using an augmented reality interface is shown in FIG. 6. The process 600 may be utilized to enable users to more optimally monitor, configure, and control microphones, microphone arrays, loudspeakers, loudspeaker arrays, equipment, and other devices and objects within an environment, based on the positional information of the devices and/or objects within the environment and based on images and/or video captured by a camera or other image sensor. The positional information may be detected and provided in real-time by a local positioning system. The result of the process 600 may be the generation of an augmented image for user monitoring, configuration, and control, as well as the ability for the user to interact with the augmented image to view and cause changes to parameters and characteristics of the devices in the environment.

The system 200 and the process 600 may be utilized with various configurations and combinations of transducers, devices, and/or objects in an environment. For example, using the process 600, the transducers and devices in the environment 100 may be labeled and identified in an augmented image, and a user may control and configure the transducers and devices on the augmented image. In embodiments, various parameters and/or characteristics of the transducers, devices, and/or objects can be displayed, monitored, and/or changed on the augmented image. In particular, the augmented image can include the parameters and/or characteristics for transducers, devices, and/or objects overlaid on the image and/or video captured by the camera. The configuration and control of the system 200 in the environment may be especially useful in situations where the user is not physically near the environment. For example, the user's vantage point may be far away from a stage in a music venue, such as at a mixer board, where the user cannot easily see the transducers, devices, and objects in the environment. Furthermore, it may be convenient and beneficial for a user to use the augmented image to monitor, configure, and/or control multiple transducers and devices in the environment simultaneously, as well as to allow the user to see the transducers and devices and their parameters and/or characteristics in real-time.

At step 602, the positional information (i.e., positions and/or orientations) of the transducers, devices, and/or objects within an environment may be received at the processor 202 from the local positioning system processor 220. The transducers, devices, and/or objects being tracked within the environment may each be attached to a tag 224 of the local positioning system, as described previously. The transducers, devices, and objects may include microphones (with single or multiple elements), microphone arrays, loudspeakers, loudspeaker arrays, persons, and other devices and objects in the environment.

In embodiments, the position and orientation of some of the transducers, devices, and objects within the environment may be manually set and/or be determined without use of the local positioning system processor 220 (i.e., without having tags 224 attached). For example, the display 212 may be fixed and non-movable within the environment, so its positional information may be known and set without needing to use the local positioning system. In embodiments, while a position of a camera 216 may be fixed within an environment, the orientation of the camera 216 may be received at the processor 202 to be used for computing and displaying a two dimensional projection of the transducers, devices, and objects on the augmented image.

At step 604, parameters and/or characteristics of the transducers and devices within the environment may be received at the processor 202. Such parameters and/or characteristics may include, for example, directionality, steering, gain, noise suppression, pattern forming, muting, frequency response, RF status, battery status, etc. The parameters and/or characteristics may be displayed on an augmented image for viewing by a user, as described later in the process 600. At step 606, an image of the environment may be received at the processor from the camera 216 or other image sensor. In embodiments, still photos and/or real-time videos of the environment may be captured by the camera 216 and sent to the processor 202. The camera 216 may be fixed within an environment in some embodiments, or may be moveable in other embodiments, such as if the camera 216 is included in a portable electronic device.

The locations of the transducers, devices, and/or objects in the environment on the captured image may be determined at step 608, based on the positional information for the transducers, devices, and/or objects received at step 602. In particular, the locations of the transducers, devices, and/or objects in the environment can be determined since the position and orientation of the camera 216 (that provided the captured image) is known, as are the positions and orientations of the transducers, devices, and objects. In embodiments, the position vector $r_c$ of the camera 216 can be subtracted from a position vector $r_n$ of a transducer, device, or object to obtain the relative position r of the transducer, device, or object in the environment, such as in the equation: $\hat{r}=\hat{r_n}-\hat{r_c}$.

Figure 7:
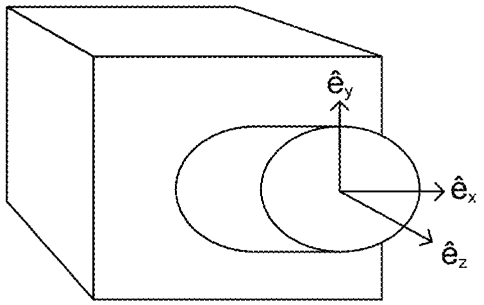
FIG. 7 is an exemplary depiction of a camera for use with the system of FIG. 2, in accordance with some embodiments.

The position of the transducer, device, or object can be projected onto the two-dimensional augmented image by computing the dot product of the relative position vector r with the unit vectors associated with the orientation of the camera 216. For example, a two-dimensional image may be aligned with the X-Y plane of the camera orientation, and the unit normal vector $\hat{e}_z$ may be aligned with the Z-axis of the camera orientation, where the unit normal vectors $\hat{e}_x$, $\hat{e}_y$, $\hat{e}_z$ are fixed to the camera 216, as shown in FIG. 7. The X and Y location on the augmented image can be computed by computing the dot product of the relative position vector r with the unit vectors $\hat{e}_x$, $\hat{e}_y$, and scaled for pixel conversion, such as in the equation: $(X, Y, Z)=(\hat{r}\cdot\widehat{e_x}, \hat{r}\cdot\widehat{e_y}, \hat{r}\cdot\widehat{e_z})$. Computing the dot product of the relative position vector r with the unit normal vector $\hat{e}_z$ can determine whether the relative position of the transducer, device, or object is in front of the camera (e.g., sgn(Z)>0) or behind the camera 216 (e.g., sgn(Z)<0). In some embodiments, an image recognition algorithm may be utilized at step 608 to assist or supplement the positional information from the local positioning system, in order to improve the accuracy and preciseness of the locations of the transducers, devices, and objects on the image.

At step 610, an augmented image may be generated by the processor 202, based on the locations of the transducers, devices, and/or objects as determined at step 608. The augmented image may include various information overlaid on the transducers, devices, and/or objects as shown in the captured image of the environment. Such information may include a name, label, position, orientation, parameters, characteristics, and/or other information related to or associated with the transducers, devices, and objects. After being generated, the augmented image may be displayed on the user interface 214 and/or on the display 218, for example.

It may be determined at step 612 whether user input has been received at the processor 202, such as through the user interface 214. User input may be received when the user desires to monitor, configure, and/or control a transducer or device in the environment. For example, if the user wishes to mute the microphone 208, the user may select and touch where the microphone 208 is located on the augmented image displayed on the user interface 214. In this example, an interactive menu can appear having an option to allow the user to mute the microphone 208. As another example, a user may select and touch where the equipment 206 is located on the augmented image displayed on the user interface 214 to view the current parameters of the equipment 206.

If user input is received at step 612, then at step 614, the augmented image of the environment may be modified by the processor 202 to reflect the user input, e.g., showing that the microphone 208 is muted. The modified augmented image may be shown on the user interface 214 and/or the display 218 at step 614. At step 616, a signal may be transmitted from the processor 202 to the transducer or device being configured and/or controlled. The transmitted signal may be based on the user input, e.g., a command to the microphone 208 to mute. The process 600 may return to step 602 to continue to receive the positional information of the transducers, devices, and/or objects within the environment. The process 600 may also return to step 602 if no user input is received at step 612.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A system, comprising:

a plurality of transducers;

a local positioning system configured to determine and provide a spatial configuration of each of the plurality of transducers within a physical environment, the local positioning system comprising:

at least one anchor;

a plurality of tags; and one or more positioning processors in communication with the at least one anchor and the plurality of tags, any of the one or more positioning processors configured to determine and provide the spatial configuration of each of the plurality of transducers; and one or more processors in communication with the plurality of transducers and the local positioning system, any of the one or more processors configured to:

receive the spatial configuration of each of the plurality of transducers from the local positioning system;

determine a steering vector of one or more of a lobe or a null of a self-assembling array of the plurality of transducers that comprises two or more of the plurality of transducers, based on the spatial configuration of each of the plurality of transducers; and transmit the steering vector to a beamformer to cause the beamformer to update the location of the one or more of the lobe or the null of the self-assembling array of the plurality of transducers.

2. The system of claim 1, wherein the at least one anchor is integrated with one or more of the plurality of transducers.

3. The system of claim 1, wherein the at least one anchor is disposed in the physical environment.

4. The system of claim 1, wherein each of the plurality of tags is associated with one of the plurality of transducers.

5. The system of claim 1, wherein any of the one or more positioning processors of the local positioning system is further configured to determine and provide a spatial configuration of an object situated in the physical environment.

6. The system of claim 1:

wherein the at least one anchor and the plurality of tags are each configured to transmit a positioning signal to any of the one or more positioning processors; and wherein any of the one or more positioning processors is configured to determine and provide the spatial configuration of each of the plurality of transducers based on the received positioning signals.

7. The system of claim 6, wherein the positioning signal comprises one or more of: first data transmitted from one of the plurality of transducers to any of the one or more processors via any of the one or more positioning processors, and second data transmitted from any of the one or more processors to one of the plurality of transducers via any of the one or more positioning processors.

8. The system of claim 1:

wherein any of the one or more processors is further configured to receive a spatial configuration of a target source within the physical environment; and wherein any of the one or more processors is configured to determine the steering vector based on the spatial configuration of each of the plurality of transducers, and the spatial configuration of the target source.

9. The system of claim 8:

wherein the local positioning system is further configured to determine and provide the spatial configuration of the target source within the physical environment; and wherein any of the one or more processors is further configured to receive the spatial configuration of the target source from the local positioning system.

10. The system of claim 8, wherein any of the one or more processors is configured to determine the steering vector such that one or more of the lobe or the null is steered with respect to the spatial configuration of the target source.

11. The system of claim 1, wherein the spatial configuration of each of the plurality of transducers comprises one or more of a position or an orientation of each of the plurality of transducers.

12. The system of claim 1, wherein the beamformer is caused to update the location of the location of the one or more of the lobe or the null of the self-assembling array of the plurality of transducers by: weighting audio signals of the two or more of the plurality of transducers of the self-assembling array, based on the spatial configurations of the two or more of the plurality of transducers of the self-assembling array.

13. A system, comprising:

a plurality of transducers comprising a self-assembling loudspeaker array;

a local positioning system configured to determine and provide a spatial configuration of each of the plurality of transducers within a physical environment; and one or more processors in communication with the plurality of transducers and the local positioning system, any of the one or more processors configured to:

receive the spatial configuration of each of the plurality of transducers from the local positioning system;

receive one or more of a spatial configuration of a target source within the physical environment;

determine a steering vector of one or more of a lobe or a null of the self-assembling loudspeaker array, based on the spatial configuration of each of the plurality of transducers and the spatial configuration of the target source; and transmit the steering vector to a beamformer to cause the beamformer to update the location of the one or more of the lobe or the null of the self-assembling loudspeaker array.

14. The system of claim 13, wherein any of the one or more processors is configured to determine the steering vector by determining the steering vector of the lobe of the loudspeaker array such that the lobe points from the loudspeaker array towards the position of the target source.

15. The system of claim 13, wherein any of the one or more processors is configured to determine the steering vector by determining the steering vector of the lobe of the loudspeaker array such that the lobe points from the loudspeaker array away from the position of the target source.

16. The system of claim 13, wherein any of the one or more processors is configured to determine the steering vector by determining the steering vector of the null of the loudspeaker array such that the null points from the loudspeaker array towards the position of the target source.

17. The system of claim 13, wherein any of the one or more processors is configured to determine the steering vector by determining the steering vector of the null of the loudspeaker array such that the null points from the loudspeaker array away from the position of the target source.

18. The system of claim 13:

wherein the loudspeaker array comprises a plurality of loudspeakers;

further comprising the beamformer configured to generate audio output signals associated with the one or more of the lobe or the null of the loudspeaker array, based on an input audio signal for output on the loudspeaker array;

wherein the beamformer is further configured to:

receive the input audio signal for output on the loudspeaker array; and generate the audio output signals for the plurality of loudspeakers based on the input audio signal.

19. The system of claim 13, wherein the local positioning system comprises:

at least one anchor;

a plurality of tags; and one or more positioning processors in communication with the at least one anchor and the plurality of tags, any of the one or more positioning processors configured to determine and provide the spatial configuration of each of the plurality of transducers.

20. The system of claim 19:

wherein the at least one anchor and the plurality of tags are each configured to transmit a positioning signal to any of the one or more positioning processors;

wherein any of the one or more positioning processors is configured to determine and provide the spatial configuration of each of the plurality of transducers based on the received positioning signals; and wherein the positioning signal comprises one or more of:

first data transmitted from one of the plurality of transducers to any of the one or more processors via any of the one or more positioning processors, and second data transmitted from any of the one or more processors to one of the plurality of transducers via any of the one or more positioning processors.

21. The system of claim 13, wherein the spatial configuration of each of the plurality of transducers comprises one or more of a position or an orientation of each of the plurality of transducers, and wherein the spatial configuration of the target source comprises one or more of a position or an orientation of the target source.

22. The system of claim 13, wherein the beamformer is caused to update the location of the location of the one or more of the lobe or the null of the self-assembling loudspeaker array by: weighting audio signals of transducers of the self-assembling loudspeaker array, based on the spatial configurations of the transducers of the self-assembling loudspeaker array.

* * * * *